US011048705B2

(12) United States Patent
Dialani et al.

(10) Patent No.: US 11,048,705 B2
(45) Date of Patent: Jun. 29, 2021

(54) QUERY INTENT CLUSTERING FOR AUTOMATED SOURCING

(71) Applicant: Microsoft Technology Licensing, LLC, Redmond, WA (US)

(72) Inventors: Vijay Dialani, Fremont, CA (US); Sahin Cem Geyik, Redwood City, CA (US); Abhishek Gupta, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 490 days.

(21) Appl. No.: 15/827,308

(22) Filed: Nov. 30, 2017

(65) Prior Publication Data

US 2018/0232421 A1 Aug. 16, 2018

Related U.S. Application Data

(60) Provisional application No. 62/458,883, filed on Feb. 14, 2017.

(51) Int. Cl.
*G06F 16/00* (2019.01)
*G06F 16/2457* (2019.01)
(Continued)

(52) U.S. Cl.
CPC ........ *G06F 16/24575* (2019.01); *G06F 15/76* (2013.01); *G06F 16/285* (2019.01);
(Continued)

(58) Field of Classification Search
CPC .. G06F 16/24575; G06F 16/285; G06F 15/76; G06N 20/00; G06Q 10/06;
(Continued)

(56) References Cited

U.S. PATENT DOCUMENTS 9,830,392 B1 11/2017 Garg et al.
10,373,171 B2 8/2019 Ryabchun et al.
(Continued)

OTHER PUBLICATIONS

"Non Final Office Action Issued in U.S. Appl. No. 15/851,584", dated Mar. 6, 2020, 16 pages.
(Continued)

*Primary Examiner* — Monica M Pyo
(74) *Attorney, Agent, or Firm* — Schwegman Lundberg & Woessner, P.A.

(57) ABSTRACT

Techniques for query intent clustering for automated sourcing are described. In an example embodiment, disclosed is a system comprising a processor, a storage device, and a memory device holding an instruction set executable on the processor to cause the system to perform operations. The system obtains one or more recent hire member profiles used as a basis for a search on member profiles in a social networking service. Additionally, the system extracts one or more attributes from the one or more recent hire member profiles and stores the attributes on the storage device. Moreover, the system identifies skills clusters based on the extracted attributes retrieved from the storage device. Furthermore, the system generates a search query based on the identified skills clusters. Then, a search can be performed on member profiles in the social networking service using the generated search query, returning one or more result member profiles as candidates.

16 Claims, 21 Drawing Sheets

(51) Int. Cl.
| | |
|---|---|
| *G06Q 50/00* | (2012.01) |
| *H04L 29/08* | (2006.01) |
| *G06Q 10/06* | (2012.01) |
| *G06N 20/00* | (2019.01) |
| *G06F 16/28* | (2019.01) |
| *G06F 15/76* | (2006.01) |
| *H04L 29/06* | (2006.01) |

(52) U.S. Cl.
CPC ............ *G06N 20/00* (2019.01); *G06Q 10/06* (2013.01); *G06Q 50/01* (2013.01); *H04L 67/20* (2013.01); *H04L 67/306* (2013.01); *H04L 67/42* (2013.01)

(58) Field of Classification Search
CPC ....... G06Q 50/01; H04L 67/20; H04L 67/306; H04L 67/42
USPC ......................................................... 707/748
See application file for complete search history.

(56) References Cited

U.S. PATENT DOCUMENTS

| | | | |
|---|---|---|---|
| 10,628,506 | B2 | 4/2020 | Dialani et al. |
| 2006/0229896 | A1* | 10/2006 | Rosen .................... G06Q 10/10 705/321 |
| 2010/0169300 | A1 | 7/2010 | Liu et al. |
| 2011/0145348 | A1 | 6/2011 | Benyamin et al. |
| 2011/0208730 | A1 | 8/2011 | Jiang et al. |
| 2012/0203584 | A1* | 8/2012 | Mishor .................. G06Q 30/02 705/7.11 |
| 2012/0226681 | A1* | 9/2012 | Paparizos ......... G06F 16/24578 707/723 |
| 2013/0124497 | A1 | 5/2013 | Lin et al. |
| 2013/0246383 | A1 | 9/2013 | White et al. |
| 2013/0325838 | A1 | 12/2013 | Liao |
| 2014/0180770 | A1* | 6/2014 | Baeck ................ G06Q 10/1053 705/7.39 |
| 2014/0207746 | A1 | 7/2014 | Song et al. |
| 2015/0095121 | A1 | 4/2015 | Bastian et al. |
| 2015/0262081 | A1* | 9/2015 | Rodriguez ............. G06N 7/005 706/12 |
| 2015/0324440 | A1 | 11/2015 | Subramanian et al. |
| 2016/0021141 | A1* | 1/2016 | Liu ..................... H04L 63/1433 726/23 |
| 2016/0034464 | A1* | 2/2016 | Sinha .................... H04L 67/306 707/732 |
| 2016/0092506 | A1* | 3/2016 | Liu ..................... G06F 16/2423 707/767 |
| 2016/0155067 | A1* | 6/2016 | Dubnov ............. G06F 17/2785 706/12 |
| 2016/0203221 | A1 | 7/2016 | Rao et al. |
| 2016/0321367 | A1* | 11/2016 | Arya .................... G06F 16/9535 |
| 2016/0321614 | A1 | 11/2016 | Leslie |
| 2017/0337202 | A1 | 11/2017 | Arya et al. |
| 2017/0344554 | A1 | 11/2017 | Ha et al. |
| 2017/0344555 | A1 | 11/2017 | Yan et al. |
| 2017/0344556 | A1 | 11/2017 | Wu et al. |
| 2017/0344954 | A1 | 11/2017 | Xu et al. |
| 2017/0364596 | A1* | 12/2017 | Wu ........................ G06N 20/00 |
| 2018/0060387 | A1* | 3/2018 | Le ....................... G06F 16/9024 |
| 2018/0232434 | A1 | 8/2018 | Geyik et al. |
| 2018/0232702 | A1 | 8/2018 | Dialani et al. |
| 2018/0239829 | A1 | 8/2018 | Dialani et al. |
| 2018/0239830 | A1 | 8/2018 | Dialani et al. |

OTHER PUBLICATIONS

"Final Office Action Issued in U.S. Appl. No. 15/852,491", dated Mar. 6, 2020, 25 Pages.
"Non Final Office Action Issued in U.S. Appl. No. 15/852,491", dated Oct. 29, 2019, 20 Pages.
"Final Office Action Issued in U.S. Appl. No. 15/852,560", dated Dec. 13, 2019, 15 Pages.
"Non Final Office Action Issued in U.S. Appl. No. 15/852,560", dated Sep. 6, 2019, 38 Pages.
"Notice of Allowance Issued in U.S. Appl. No. 15/852,560", dated Feb. 14, 2020, 7 Pages.
Bhattarai, Shishir, "Interactive Intent Modeling: Usefulness of Session-level Relevance Feedback", In Master's Thesis Submitted to School of Science, Aalto University, Sep. 24, 2016, 49 Pages.
Duan, Huizhong, "Intent Modeling and Automatic Query Reformulation for Search Engine Systems", In Dissertation for the Degree of Doctor of Philosophy in Computer Science, the University of Illinois at Urbana-Champaign, 2013, 139 Pages.
Geyik, et al., "In-session Personalization for Talent Search", In Proceedings of the 27th ACM International Conference on Information and Knowledge Management, Oct. 22, 2018, pp. 2107-2115.
Ha-Thuc, et al., "From Query-By-Keyword to Query-By-Example: Linkedin Talent Search Approach", In Proceedings of the ACM on Conference on Information and Knowledge Management, Nov. 6, 2017, pp. 1737-1745.
Ha-Thuc, et al., "Learning to Rank Personalized Search Results in Professional Networks", In Proceedings of the 39th International ACM SIGIR Conference on Research and Development in Information Retrieval, Jul. 17, 2016, pp. 461-462.
Ha-Thuc, et al., "Personalized Expertise Search at LinkedIn", In Proceedings of IEEE International Conference on Big Data, Oct. 29, 2015, 10 Pages.
Liao, Yiping, "Interactive Intent Modeling Based on Probabilistic Sparse Models", In Master's Thesis Submitted to School of Science, Aalto University, Jan. 19, 2017, 56 Pages.
Yu, et al., "Latent Dirichlet Allocation based Diversified Retrieval for E-commerce Search", In Proceedings of the 7th ACM International Conference on Web Search and Data Mining, Feb. 24, 2014, 10 Pages.
"Non Final Office Action Issued in U.S. Appl. No. 15/851,584", dated Sep. 3, 2020, 15 Pages.
"Final Office Action Issued in U.S. Appl. No. 15/852,523", dated Sep. 24, 2020, 9 Pages.
"Non Final Office Action Issued in U.S. Appl. No. 15/852,523", dated May 1, 2020, 11 Pages.
Sadikov, Eldar, et al., "Clustering Query Refinements by User Intent" WWW, Apr. 2010, pp. 841-850.
"Non Final Office Action Issued in U.S. Appl. No. 15/852,523", dated Dec. 24, 2020, 09 Pages.
"Notice of Allowance Issued in U.S. Appl. No. 15/852,523", dated Mar. 8, 2021, 10 Pages.

\* cited by examiner

FIG. 19 under the US 11,048,705 B2

QUERY INTENT CLUSTERING FOR AUTOMATED SOURCING

PRIORITY CLAIM

This application claims the benefit of priority to U.S. Provisional Patent Application No. 62/458,883 entitled "Query Intent Clustering for Automated Sourcing", filed Feb. 14, 2017, which is incorporated herein by reference in its entirety.

TECHNICAL FIELD

The present disclosure generally relates to computer technology for solving technical challenges in determining user intents for search queries. More specifically, the present disclosure relates to creating a stream of candidates by using query intent clustering to determine possible user query intents.

BACKGROUND

The rise of the Internet has occasioned two disparate phenomena: the increase in the presence of social networks, with their corresponding member profiles visible to large numbers of people, and the increase in use of social networks for job searches, by applicants, employers, social referrals and recruiters. Employers, and recruiters attempting to connect candidates and employers or refer them to a suitable position, often perform searches on social networks to identify candidates who have relevant qualifications that make them good candidates for whatever job opening the employers or recruiters are attempting to fill. The employers or recruiters then can contact these candidates to see if they are interested in applying for the job opening.

Traditional querying of social networks for candidates involves the employer or recruiter entering one or more search terms to manually create a query. A key challenge in a searching for candidates (e.g., talent search) is to translate the criteria of a hiring position into a search query that leads to desired candidates. To fulfill this goal, the searcher has to understand which skills are typically required for the position, what are the alternatives, which companies are likely to have such candidates, which schools the candidates are most likely to graduate from, etc. Moreover, the knowledge varies over time. As a result, it is not surprising that even for experienced recruiters, many search trials are often required in order to obtain an appropriate query that meets the recruiters' search intent.

BRIEF DESCRIPTION OF THE DRAWINGS

Some embodiments of the technology are illustrated, by way of example and not limitation, in the figures of the accompanying drawings.

FIG. 19 is a screen capture illustrating a second screen of the user interface for performing a recent hire-based search, in accordance with an example embodiment.

DETAILED DESCRIPTION

Figure 1:
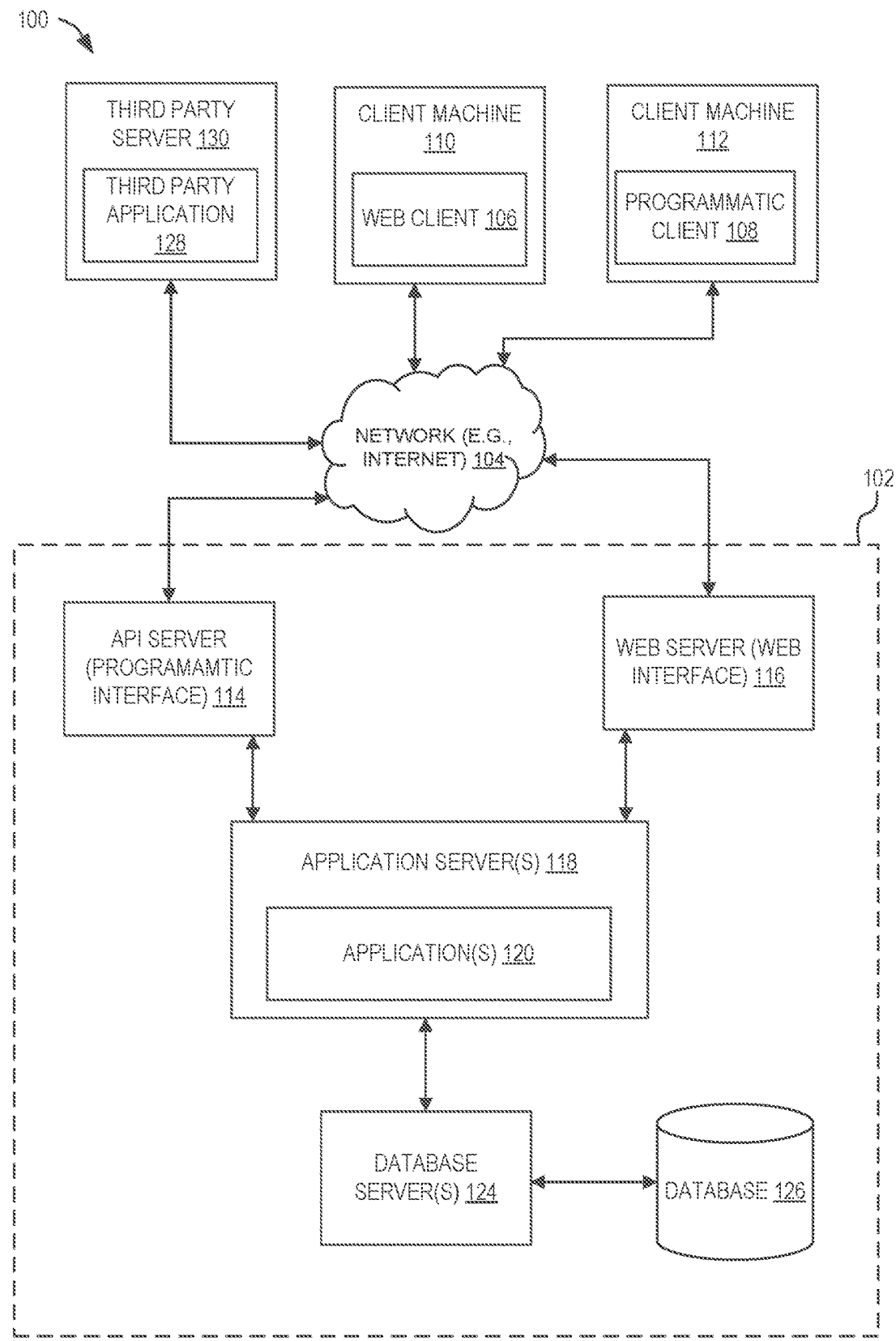
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided whereby a stream of candidates is created from a minimal set of attributes, such as, for example, a combination of title and geographic location. As used herein, the terms 'stream of candidates' and 'candidate stream' generally refer to sets of candidates that can be presented or displayed to a user. The user can be a user of an automated sourcing recruiting tool or a user of a program that accesses an application programming interface (API). For example, the user can be a recruiter or a hiring manager that interacts with a recruiting tool to view and review a stream of candidates being considered for a position or job. Possible user query intents can be represented by segmentation of candidates in a stream. In certain embodiments, the segmentations can be performed using a query intent clustering approach. Member profiles for a set of candidate profiles can be represented as document vectors, and possible intent clusters of skills, previous companies, educational institutions, seniority, years of experience and industries to hire from can be determined. In additional or alternative embodiments, derived latent features based on member profiles and hiring companies can be used to formulate a query intent.

Example embodiments provide systems and methods for query intent clustering for a search query, where the search query is a candidate query in an automated sourcing context. According to these embodiments, automated sourcing allows a user, such as, for example, a recruiter or hiring manager, to create a stream from a minimal set of attributes. As used herein, in certain embodiments, the term 'automated sourcing' refers to systems and methods that offer intelligent candidate suggestions to users such as, for example, recruiters, hiring managers, and small business owners. For example, a recommendation system offers such intelligent candidate suggestions while accounting for users' personal preferences and immediate interactions with the recommendation system. Automated sourcing enables such users to review and select relevant candidates from a candidate stream without having to navigate or review a large list of candidates. For example, automated sourcing can provide a user with intelligent suggestions automatically selected from a candidate stream or flow of candidates for a position to be filled without requiring the user to manually move through a list of thousands of candidates. In the automated sourcing context, such a candidate stream can be created based on minimal initial contributions or inputs from users such as small business owners and hiring managers.

Instead of requiring large amounts of explicit user feedback, automated sourcing techniques infer criteria with attributes and information derived from the user's company or organization, job descriptions, other companies or organizations in similar industries, and implicit user feedback (e.g., feedback inferred based on recent hires). Among many attributes or factors that can contribute to the criteria for including members of a social networking service in a stream of candidates, embodiments use a standardized job title and location to start a stream. In certain embodiments, the social networking service is an online professional network. As a user is fed a stream of candidates, the user can assess respective ones of the candidates. This interaction information can be fed back into a relevance engine that includes logic for determining which candidates end up in a stream. In this way, automated sourcing techniques continue to improve the stream.

According to an embodiment, a system learns attributes of recent hires as compared to the rest of a population of candidates. In certain examples, the attributes can include a combination of title and location (e.g., a candidate's job title and geographic location). The geographic location can be, for example, a metropolitan area, such as a city, a county, a town, or any other municipality.

An example system is able to represent all possible user intents through a segmentation of candidates in a given stream. The system is configured to perform such a segmentation without direct control of the search query. In an embodiment, a system is provided that generates such segmentations using a query intent clustering approach. For example, starting with a set of candidates who have recently transitioned into a title (i.e., recent hires for a given job title) specified by the stream, an embodiment represents a candidate profile as a bag of urns. In this example, an urn is an entity type associated with a member profile, where an entity type represents an attribute of the member's profile (e.g., skills, education, experience, current and past organizations). For instance, member profiles can be uniquely identified by urns, where the urns can include urns for skills (e.g., C++ programming experience) and other urns for company or organization names (e.g., names of current and former employers). Embodiments use such urns to represent member profiles as document vectors by performing latent Dirichlet allocation (LDA) to determine possible intent clusters of skills, previous companies, educational institutions, and industries to hire from. For example, each member profile can be viewed as document having a mixture of various topics (e.g., various skills, organizations, and industries). By using LDA, a set of topics can be assigned to each profile. According to these embodiments, the topic distribution is assumed to have a Dirichlet prior probability distribution. Topic vectors can be obtained by performing LDA on member profiles corresponding to a given title, and titles synonymous with the given title.

As used herein, in certain embodiments, the term 'intent cluster' refers to a grouping of inferred intents of a user such as a recruiter. Intent clusters can be based on attributes of recent hire decisions made by the user for a position or job having a given title. The query intent clustering techniques disclosed herein do not require displaying the query for editing by the user. Instead, the user's query can be tuned automatically behind the scenes. For instance, query intent clustering can be used to automatically tune a query based on feedback as a user is looking for candidates, and selects or rejects candidates in a candidate stream.

Embodiments can personalize intent clusters for a user based on the user's attributes (e.g., the user searching for a member to hire) in combination with company attributes (e.g., geographic location of a company or organization that is seeking to hire candidates). In this way, the embodiments provide customized intents for various users, such as, for example, hiring managers from different companies who are searching for different candidates (e.g., different job titles). Such customization improves efficiency for recruiting tools by providing the most relevant set of candidates quickly and not requiring users to modify or tune queries for each search.

Certain embodiments determine multiple intents represented by a candidate stream defined by attributes, such as, for example, title and location. To determine these multiple intents, embodiments cluster data for recent hires. One example data source for recent hire information includes member profiles with a given title. According to this example, this data source can also include member profiles for members whose titles match synonyms of the given title. In an additional or alternative embodiment, another source for recent hire data includes queries that lead to the profiles with this particular given title. In another embodiment, another source for recent hire data includes profiles of recent hires.

Embodiments choose recent hires as a list of candidates who are more likely to have an updated skill set and who reflect the profile of people who are able to obtain new positions corresponding to a position to be filled. Instead of relying on recruiter queries or member profiles that can result in member or recruiter search-based biases, embodiments perform query intent clustering based on recent hire data. For example, the embodiments can select members from a 100-day window ending on a given date (e.g., Jan. 31, 2017), including all member profiles for members who have changed their position or employment within the 100-day window where the members' recent titles match a given title or the title's synonyms. A user conducting the candidate search can select the particular title and synonyms for the title. For example, a small business owner, hiring manager, or recruiter can select a title of 'Software Engineer' and indicate that synonymous titles include 'Software Developer.' According to some embodiments, a user can select a title of interest (e.g., a title of a job or position the user is seeking to fill), and titles synonymous with the selected title can be retrieved from a database table or data store that maps titles to their synonyms. In response to receiving the particular, selected title, an example system can identify software engineers and software developers who changed positions during a period of interest (e.g., a 100-day window).

Embodiments exploit correlations between certain attributes of member profiles and other attributes. One such correlation is the correlation between a member's title and the member's skills. For example, within member profile data, there exists a strong correlation between title and skills (e.g., a title+skills correlation). Such a title+skills correlation can be used as a model for ranking candidates. As a first step towards generating a bootstrap query for automated sourcing, an embodiment investigates skills clusters.

In an example embodiment, a system is provided whereby, given attributes from a set of input recent hires, a search query is built capturing the key information in the candidates' profiles. The query is then used to retrieve and/or rank results. In this manner, a user (e.g., a searcher) may list one or several examples of good candidates for a given position. For instance, hiring managers or recruiters can utilize profiles of existing members of the team to which the position pertains. In this new paradigm, instead of specifying a complex query capturing the position requirements, the searcher can simply pick out a small set of recent hires for the position. The system then builds a query automatically extracted from the input candidates and searches for result candidates based on this built query. In some example embodiments, the automatically constructed query can also be presented to the searcher, which helps explain why a certain result shows up in a search ranking, making the system more transparent to the searcher. Further, the searcher can then interact with the system and have control over the results by modifying the initial query.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An API server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third-party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
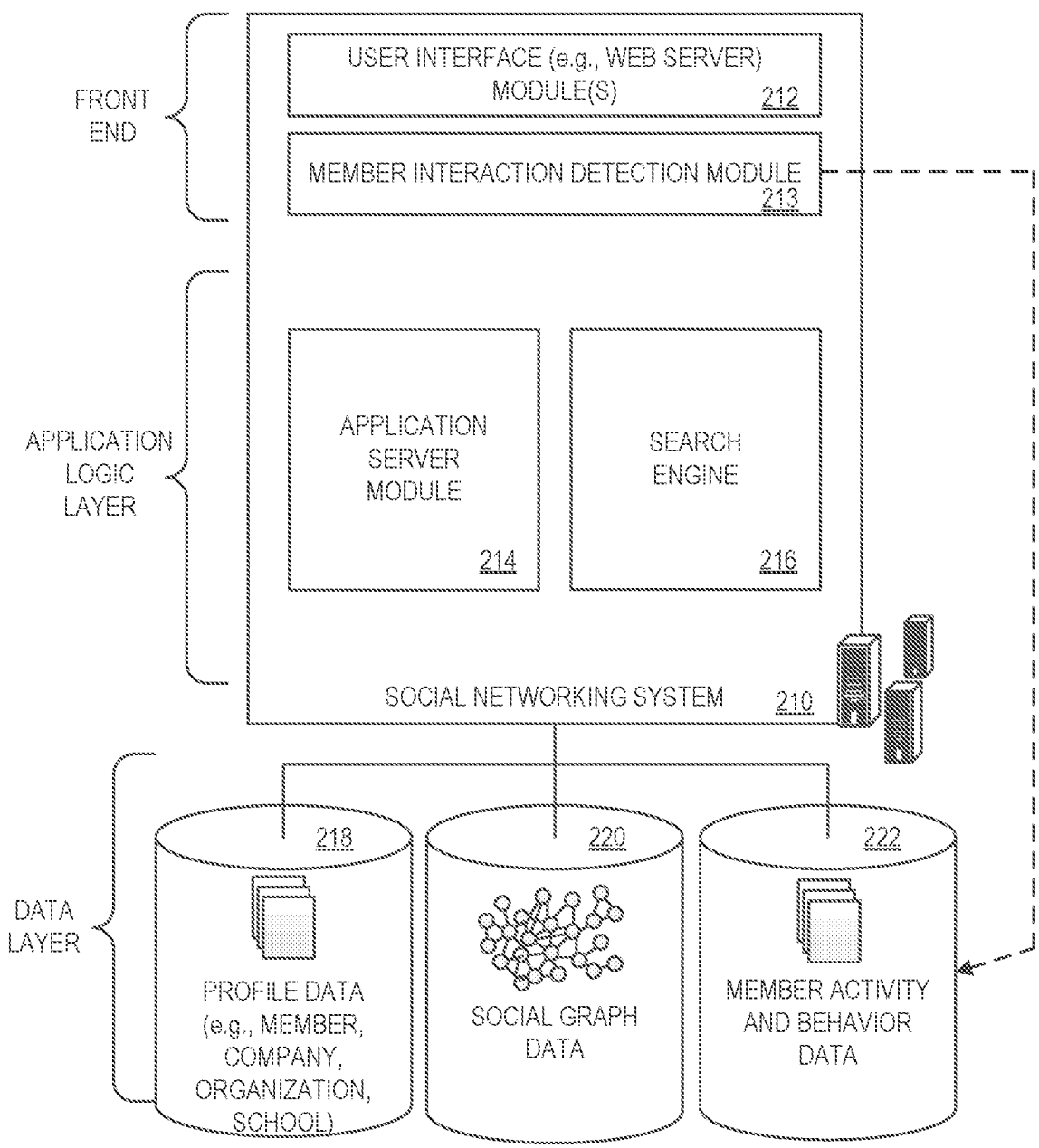
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, which can be hosted on a social networking system 210. As shown in FIG. 2, the social networking system 210 can include a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include the search engine 216 and one or more various application server modules 214 which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, research institutes, government organizations, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A 'connection' may constitute a bilateral agreement by the members, such that both members acknowledge the establishment of the connection. Similarly, in some embodiments, a member may elect to 'follow' another member. In contrast to establishing a connection, 'following' another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member who is being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 shown in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more candidate selections. Such applications 120 may be browser-based applications 120, or may be operating system specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the candidate selections available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
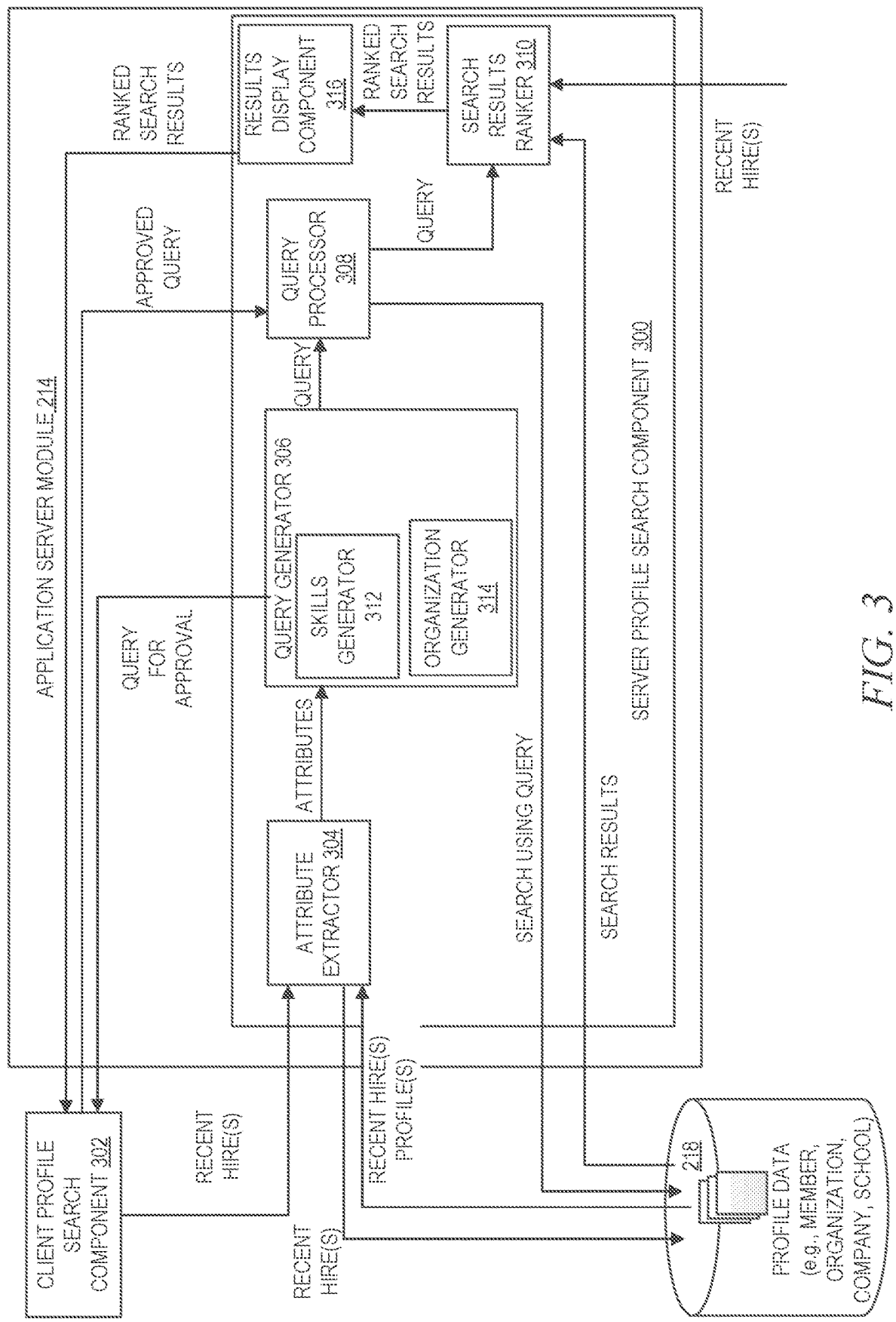
FIG. 3 is a block diagram illustrating an application server module of FIG. 2 in more detail, in accordance with an example embodiment.

FIG. 3 is a block diagram illustrating the application server module 214 of FIG. 2 in more detail. While in many embodiments, the application server module 214 will contain many subcomponents used to perform various different actions within the social networking system 210, in FIG. 3 only those components that are relevant to the present disclosure are depicted. Here, a server profile search component 300 works in conjunction with a client profile search component 302 to perform one or more searches on member profiles stored in, for example, the profile database 218. The server profile search component 300 may be, for example, part of a larger software service that provides various functionality to employers or recruiters. The client profile search component 302 may include a user interface and may be located on a client device. For example, the client profile search component 302 may be located on a searcher's mobile device or desktop/laptop computer. In some example embodiments, the client profile search component 302 may itself be, or may be a part of, a stand-alone software application on the client device. In other example embodiments, the client profile search component 302 is a web page and/or web scripts that are executed inside a web browser on the client device. Regardless, the client profile search component 302 is designed to accept input from the searcher and to provide visual output to the searcher.

In an example embodiment, the input from the client profile search component 302 includes an identification of one or more recent hires for a job opening. This identification may be accomplished in many ways. In some example embodiments, the input may be an explicit identification of one or more member profiles stored in the profile database 218. This explicit identification may be determined by the searcher, for example, browsing or otherwise locating specific recent hire profiles that the searcher feels match a position the searcher is currently seeking to fill. For example, the searcher may know the identity of individuals on a team in which the open position is available, and may navigate to and select the profiles associated with those team individuals. In another example embodiment, the searcher may create one or more hypothetical 'recent hire' profiles and use those as the input. In another example embodiment, the searcher may browse or search profiles in the profile database 218 using traditional browsing or searching techniques. In some example embodiments, the explicit identification may be provided by the job poster.

The server profile search component 300 may contain an attribute extractor 304. The attribute extractor 304 may be implemented as a system component or module that is configured to extract one or more attributes from one or more profiles of one or more recent hires (i.e., one or more recent hire member profiles). For instance, the attribute extractor 304 may be configured to extract raw attributes, including, for example, skills, companies, titles, schools, industries, etc., from the profiles of the one or more recent hires. These raw attributes are then passed to a query generator 306. The query generator 306 may be implemented as a system component or module that is configured to aggregate the raw attributes across the input candidates, expand them to similar attributes, and then select the top attributes that most closely represent the recent hires. In example embodiments, for each attribute type, the query generator 306 aggregates the raw attributes across the input candidates, expands them to similar attributes, and finally selects the top attributes that most closely represent the recent hires.

After a candidate query is generated, in an example embodiment, the generated query may be shown to the searcher via the client profile search component 302 and the searcher may have the opportunity to edit the generated query. This may include adding or removing some attributes, such as skills and companies, to or from the query. As part of this operation, a query processor 308 may perform a search on the query and present raw results to the searcher via the client profile search component 302. These raw results may be useful to the searcher in determining how to edit the generated query.

In some example embodiments, refinement questions are presented to a searcher in order to refine a query. For instance, responses to refinement questions received from the searcher can be used to refine a generated query. In another example embodiment, a machine learning model is trained to make 'smart suggestions' to the searcher as to how to modify the generated query. The model may be trained to output suggestions based on any number of different facets, such as title, company or organization (e.g., a firm, corporation, university, government agency, or other entity), industry, location, school, and skill.

Usage data can be gathered regarding actions taken h searchers when presented with a suggestion, including (1) adding the suggestion, (2) deleting the suggestion, or (3) ignoring the suggestion. Intuitively, if a searcher adds a suggestion, it is probably a desired one, and thus can be considered a positive training sample. If the searcher deletes the suggestion, it is probably not a desired one, and thus can be considered a negative training sample. For ignored suggestions, if the suggestion is positioned lower than an added suggestion (e.g., 'Santa Clara University' is positioned lower than added 'University of California, Santa Cruz'), then it is not certain whether the suggestion was really ignored by searchers or useless in the setting of the query. Thus, this data can be ignored. If, however, the ignored suggestion is positioned higher than an added suggestion, it can be treated as a negative training sample. In some embodiments, there may be more than one added suggestion. For example, an ignored suggestion could be positioned both higher and lower than (i.e., between) added suggestions.

After the query is modified, the query processor 308 may refresh the search results. A search results ranker 310 may act to rank the search results, taking into account both the query (including potentially the generated query and the modified generated query) and the input recent hires when ranking the search results.

Referring back to the query generator 306, given the raw attributes from the profiles of the recent hires, the query generator 306 generates a query containing skills, companies, titles, etc. that best represents the recent hires.

The query generator 306 may comprise a skills generator 312 designed to generate skills to be added to the generated query. The social networking service may allow members to add skills to their profiles. Typical examples of skills that, for example, an information technology (IT) recruiter might search could be 'search,' 'information retrieval,' 'machine learning,' etc. Members may also endorse skills of other members in their network by, for example asserting that the member does indeed have the specified skills. Thus, skills may be an important part of members' profiles that showcase their professional expertise. A technical challenge encountered, however, is that recent hires may not explicitly list all of the skills they have on their profiles. Additionally, some of their skills may not be relevant to their core expertise. For example, an IT professional may list 'non-profit fundraising' as a skill.

To overcome these challenges, expertise scores for the recent hire may be estimated based on explicit skills (skills the recent hire has explicitly listed in a member profile or resume) as well as implicit skills (skills the recent hire is likely to have, but has not explicitly inked).

Figure 4:
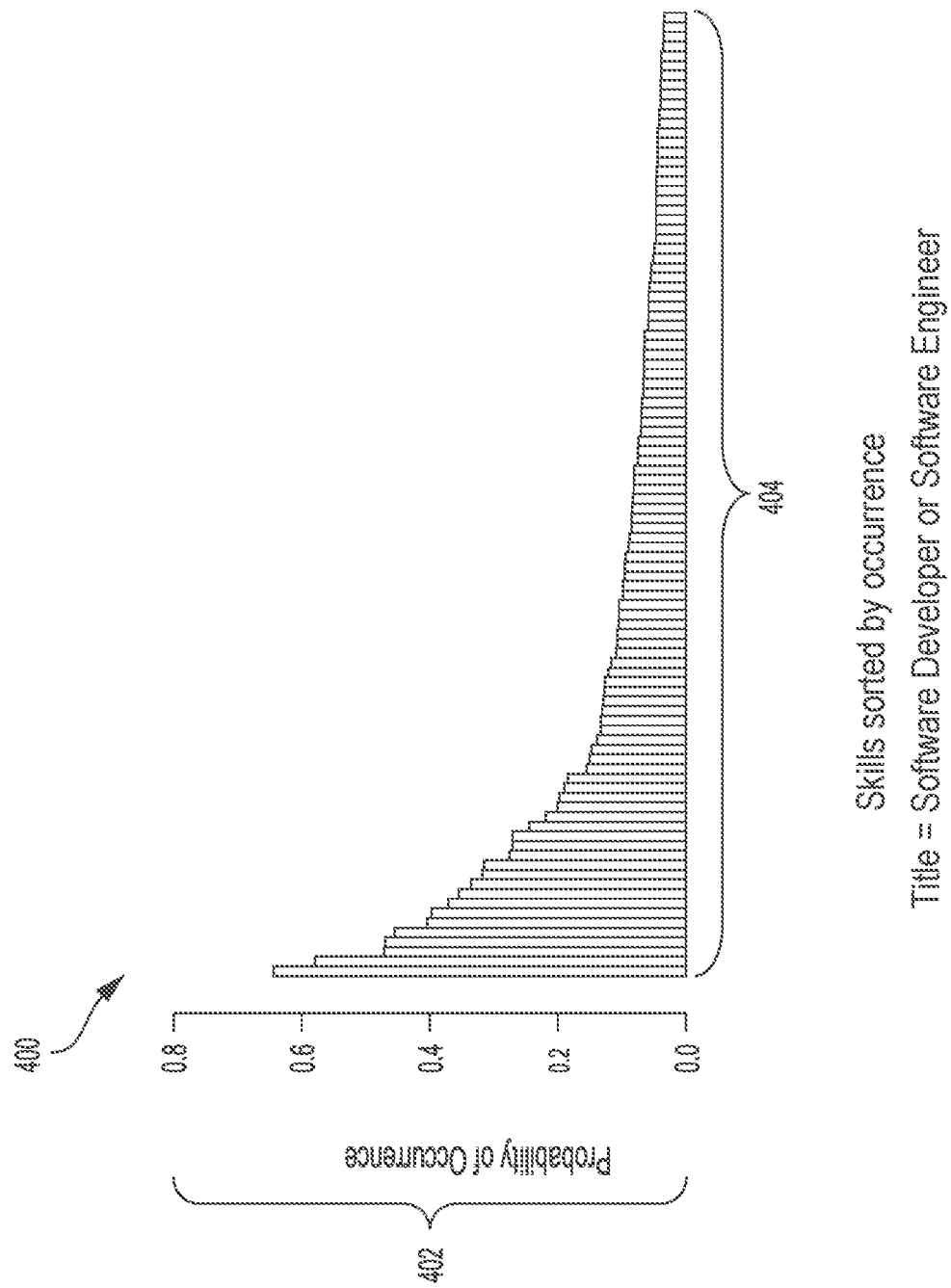
FIG. 4 is a bar chart illustrating probabilities of occurrences of clusters of skills in recent hires, in accordance with an example embodiment.

FIG. 4 is a bar chart 400 illustrating probabilities of occurrences 402 of clusters of skills 404 in recent hires. The bar chart 400 can be conceptualized as a summary of a training dataset. As shown, the bar chart 400 illustrates the probabilities of occurrences 402 for the skills 404. In the example of FIG. 4, the skills 404 are plotted for recent hires with the title of 'software developer' or 'software engineer.'

The bar chart 400 shows how skills 404 for a given title, 'software developer' and its synonym 'software engineer' in the example of FIG. 4, can be plotted and clustered. For the given title, clusters of the skills 404 follow a power law distribution, with few of the skills 404 being highly prevalent (i.e., having relatively higher probabilities of occurrences 402) amongst the population of recent hires, followed by a heavy tail of less prevalent skills 404 with lower probabilities of occurrences 402.

Figure 5:
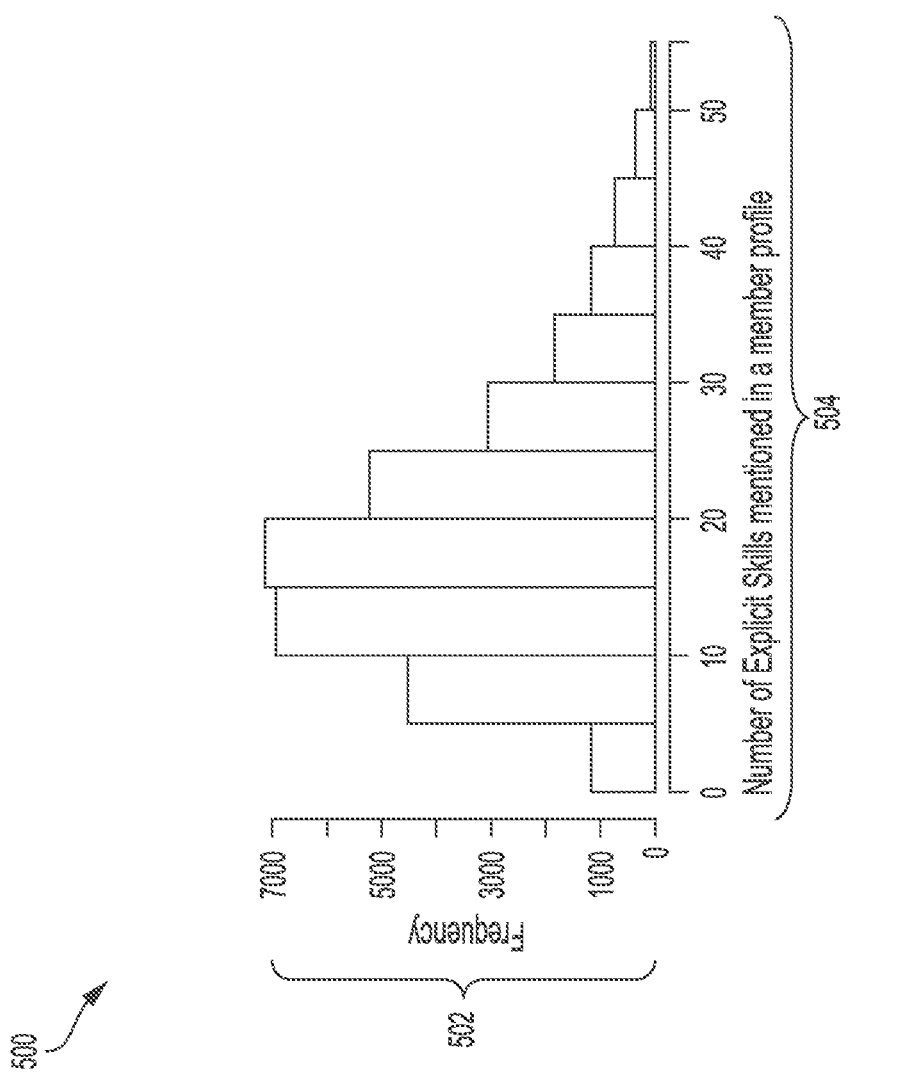
FIG. 5 is a bar chart illustrating a distribution of unique explicit skills among recent hires, in accordance with an example embodiment.

FIG. 5 is a bar chart 500 illustrating a distribution of numbers of unique explicit skills 504 observed among recent hires. As shown, frequencies 502 of respective numbers of unique, explicit skills 504 are plotted in the bar chart 500. In the example embodiment depicted in FIG. 5, on a per member basis, the average number of explicit skills for a member is about 20, and the distribution in the bar chart 500 shows that about 50% of the member profiles have more than 20 skills. In an embodiment, a skill reputation score can be used to identify relevant and important skills amongst those associated with a member's profile. In an embodiment, the bar chart 500 can show coverage of regional data for a given title identifier (title ID) in standardized data.

Given data for recent hires, each identified skill identifier (skills ID) can be treated as a categorical variable, and a sparse matrix representation (M) of this data has member profiles represented as rows and the skills as columns for each profile. In an embodiment, there is one such matrix M for each title ID for which a query intent clustering method creates query clusters. An embodiment uses latent class analysis (LCA) to find groups or subtypes of cases in the new hire data. An example method uses an LCA-based approach to create skills clusters. For instance, given that matrix M is a sparse binary matrix, LCA can be used to create the skills clusters. An example implementation of the method can use a software package to analyze new hire data. For instance, a software package can be used with a recruiting tool to estimate latent class models and latent class regression models for polytomous outcome variables, implemented in a statistical computing environment. Such analysis can reveal that latent vectors for skills represent different job types that may be represented for a title.

After the clusters have been identified using LCA, the method retains the skills whose class probabilities for the cluster are different from the population means in a statistically significant way by performing a G-test. For example, a G-test can be performed as part of the method to determine statistically significant likelihood ratios or maximum-likelihood statistical significance tests for the new hire data. Examples of ten skills clusters generated for a title ID of 'software developer' and its synonym 'software engineer' are provided in table 1 below.

TABLE 1

Example Skills Clusters

| ClusterID | Skills | Notes |
|---|---|---|
| 1 | programming, matlab, web_development, html5, windows, microsoft_excel, databases, adobe_photoshop, research, project_management, sql, c_plus_plus, powerpoint, java, html, cascading_style_sheets_css_, c, microsoft_word, android_development, mysql, c#, php, microsoft_office, javascript | LAMP developer |
| 2 | adobe_photoshop, matlab, windows, research, microsoft_word, project_management, powerpoint, microsoft_office, microsoft_excel, c | Web Developer |
| 3 | matlab | Scientific Developer |
| 4 | ajax, java, spring_framework, android, javascript, xml, web_services, git, scrum, java_enterprise_edition, eclipse, objectoriented_programming_oop_, sql, agile_methodologies, unix, software_development, web_applications, mysql, oracle | J2EE developer |
| 5 | java, unix, java_enterprise_edition, spring_framework, web_applications, oracle, adobe_photoshop, node.js, android, objectoriented_programming_oop_, algorithms, android_development, web_services, scrum, ajax, angularjs, windows, visual_studio, databases, asp.net, .net_framework, software_engineering, agile_methodologies, eclipse, html5, web_development, microsoft_sql_server, git, xml, programming, jquery, php, python, linux, c#, mysql, software_development, c, cascading_style_sheets_css_, html, c_plus_plus, sql, javascript | Java + .Net Developer |
| 6 | web_development, xml, cascading_style_sheets_css_, asp.net, databases, ajax, sql, scrum, web_applications, jquery, javascript, web_services, angularjs, microsoft_sql_server, agile_methodologies, c#, oracle, | .Net Web Frontend Developer |

TABLE 1-continued

Example Skills Clusters

| ClusterID | Skills | Notes |
|---|---|---|
| 7 | html, visual_studio, html5, software_development, .net_framework, objectoriented_progamming_oop_web_services, software_development, project_management, visual_studio, sql, .net_framework, agile_methodologies, databases, asp.net, xml, microsoft_sql_server, oracle, scrum, c# | .Net Developer |
| 8 | jquery, angularjs, mysql, git, php, javascript, html5, ajax, node.js, adobe_photoshop, cascading_style_sheets_css_, html, web_applications, web_development | Frontend Developer |
| 9 | java, matlab, git, programming, python, linux, algorithms, unix, software_development, c, objectoriented_programming_oop_, android, software_engineering, c_plus_plus, agile_methodologies, eclipse | Unix/Linux Developer |
| 10 | android, algorithms, android_development, sql, mysql, programming, javascript, matlab, windows, linux, python, php, c_plus_plus, html, java, cascading_style_sheets_css_, c | Android Frontend developer |

Figure 6:
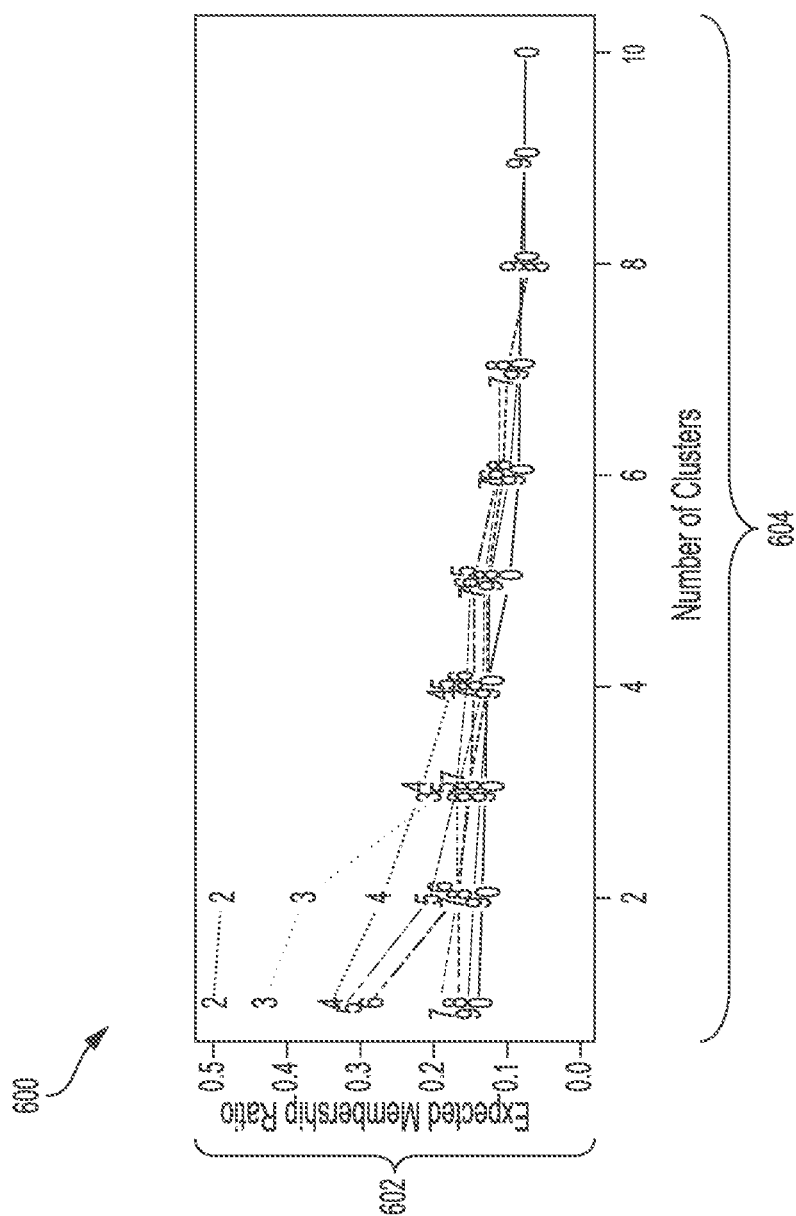
FIG. 6 is a graph illustrating query clustering, in accordance with an example embodiment.

In some embodiments, performing query clustering populates arms for a multi-armed bandit (MAB) approach. According to these embodiments, the MAB approach is a way to explore whether, for a current candidate search, certain queries are more appropriate for the search. To ascertain whether each of these skills clusters will have sufficient recall, an embodiment examines the percentage contribution of each of the clusters. FIG. 6 is a graph 600. Illustrating query clustering. As shown, the graph 600 provides details regarding cluster membership. In particular, the graph 600 shows expected membership ratios 602 relative to ten clusters 604. According to an embodiment, the ten clusters 604 can be the clusters having the cluster IDs shown in Table 1 above.

Figure 7:
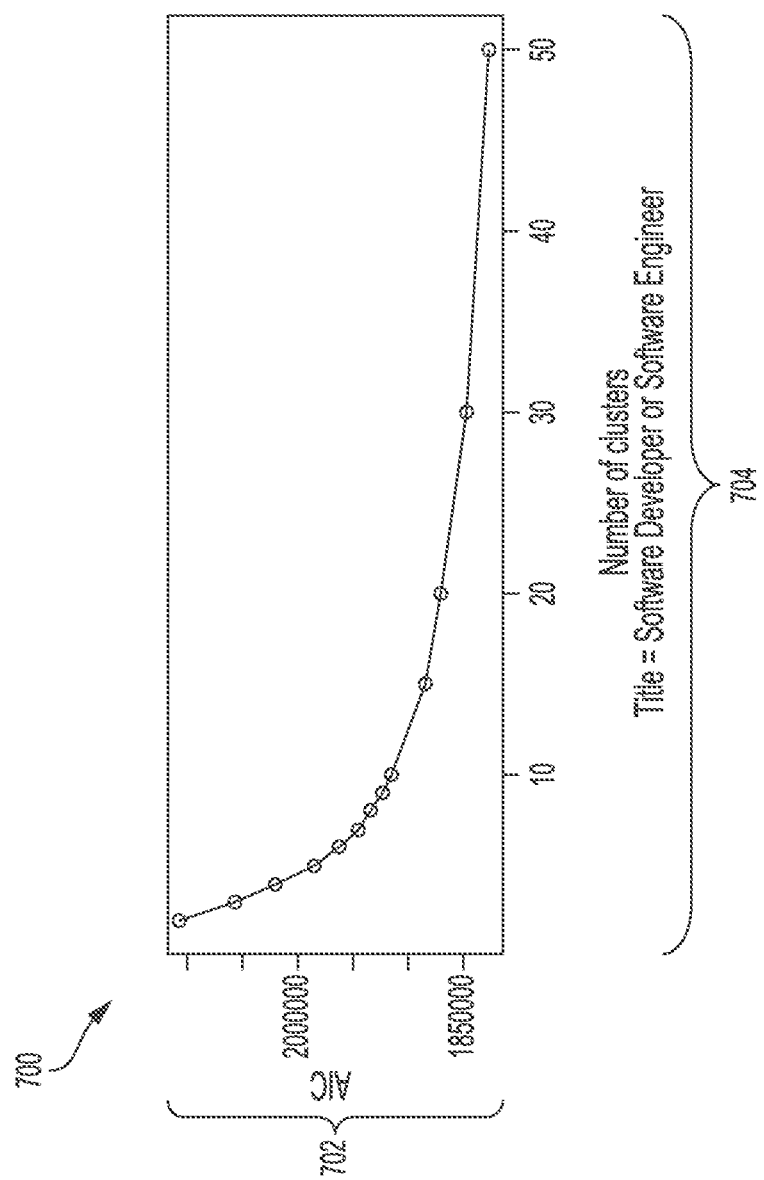
FIG. 7 is a graph illustrating Akaike information criterion (AIC) values for different numbers of clusters, in accordance with an example embodiment.

FIG. 7 is a graph 700 illustrating Akaike information criterion (AIC) values 702 for different numbers of clusters 704. As shown, the graph 700 plots the AIC values 702 corresponding to the numbers of clusters 704 for new hires having a title of 'software developer' and its synonym 'software engineer'.

Figure 8:
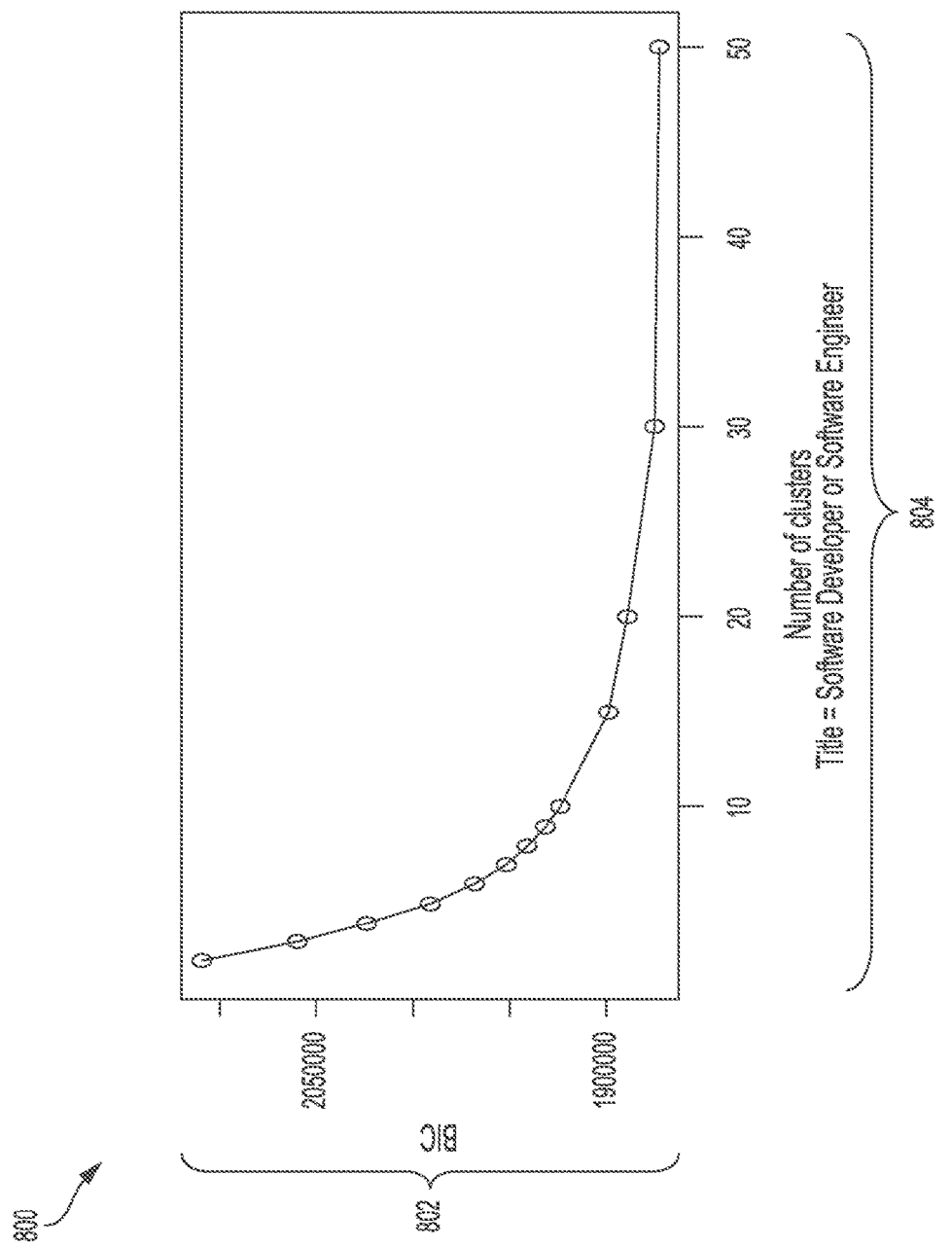
FIG. 8 is a graph illustrating Bayesian information criterion (BIC) values for different numbers of clusters, in accordance with an example embodiment.

FIG. 8 is a graph 800 illustrating Bayesian information criterion (BIC) values 802 for different numbers of clusters 804. As depicted in FIG. 8, the graph 800 plots the BIC values 802 corresponding to the numbers of clusters 804 for new hires having a title of 'software developer' or the synonymous title 'software engineer'.

In some embodiments, each of the skills in a skills taxonomy can be represented as a categorical variable that is either absent or present in a member's profile. Considering a member profile to be equivalent to a document and skills to be the words in a document, the example methods and systems for query intent clustering can perform LDA for each of the titles and then obtain the resultant topic vectors. The resultant clusters can be similar to those obtained by LCA. In one implementation, the method leverages parallel Spark-based implementation of LDA, using a Spark open source big data processing framework. The systems and methods shown in FIGS. 9-21 can be used to complete offline pipelines for query intent clustering. Also, query clusters can be deployed in the recruiting tools, interfaces, methods, and systems described with reference to FIGS. 9-21.

Figure 9:
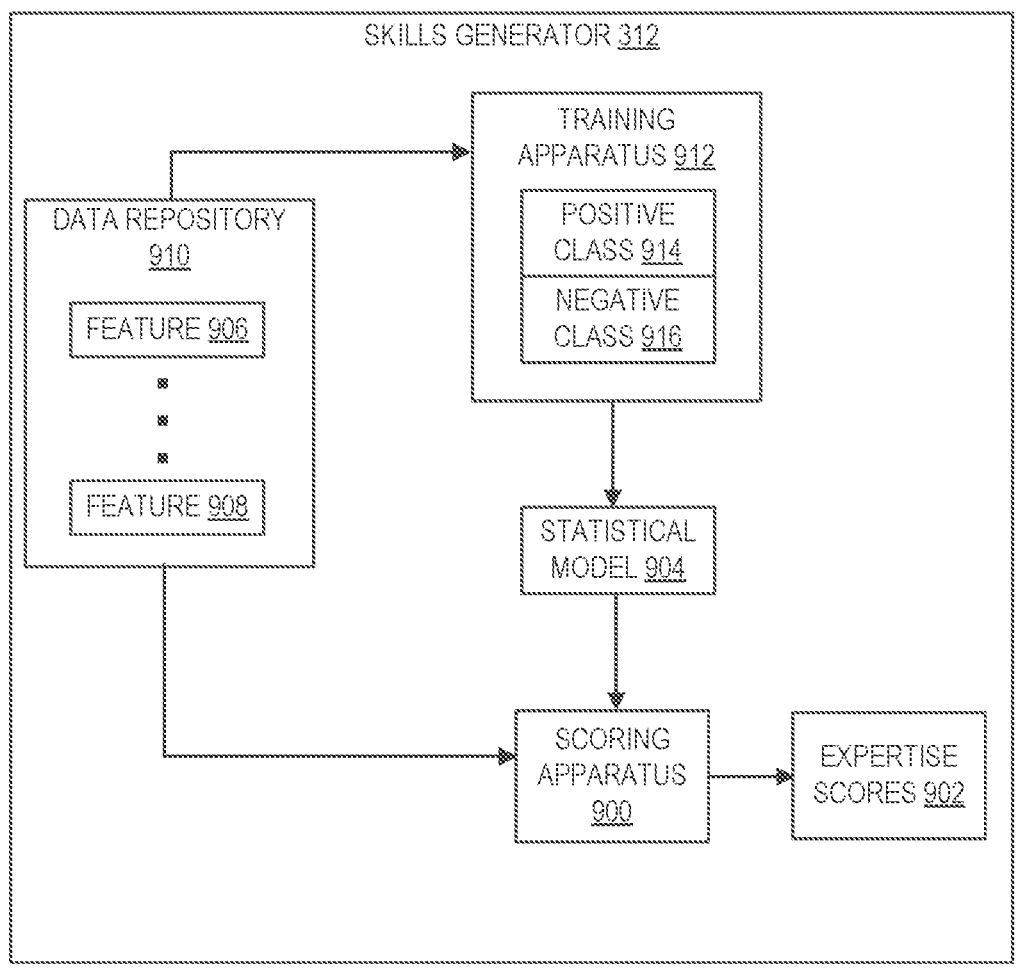
FIG. 9 is a block diagram illustrating a skills generator in more detail, in accordance with an example embodiment.

FIG. 9 is a block diagram illustrating the skills generator 312 in more detail, in accordance with an example embodiment. As shown in FIG. 9, a scoring apparatus 900 may calculate a set of expertise scores 902 using a statistical model 904 and a set of features 906-908 for candidate member profiles. The features 906-908 may be aggregated into a data repository 910 from the member profiles and/or member actions. For example, the features 906-908 may be received from a number of servers and/or data centers associated with websites and/or applications and stored in a relational database for subsequent retrieval and use.

Prior to the scoring apparatus 900 calculating the expertise scores 902 on actual member profiles, a training apparatus 912 may obtain training data for the statistical model 904, which includes a positive class 914 and a negative class 916. The positive class 914 may include data associated with items of a particular category (e.g., trait, attribute, dimension, etc.), while the negative class 916 may include data associated with items that do not belong in the category.

For example, the statistical model 904 may be a logistic regression model that classifies each member profile as either an expert or a non-expert in a corresponding skill. The positive class 914 may thus include a subset of the features 906-908 associated with members with known expertise in one or more skills. Such 'expert' members may be identified based on publications, speeches, awards, and/or contributions of the members in their respective fields. On the other hand, the negative class 916 may include a subset of the features 906-908 associated with members who are not recognized as experts in their respective fields, such as random members who list a given skill in their profiles. Because far fewer members belong in the positive class 914 than the negative class 916, the positive class 914 may be oversampled to produce a roughly class-balanced set of training data for the statistical model 904.

Next, the training apparatus 912 may use the positive class 914 and the negative class 916 to train the statistical model 904. For example, the training apparatus 912 may use maximum-likelihood estimation (MLE) and/or another estimation technique to estimate the parameters of a logistic regression model for calculating the expertise scores 902. After training of the logistic regression model is complete, the parameters may be set so that the logistic regression model outputs values close to 1 for training data in the positive class 914 and values close to 0 for training data in the negative class 916.

The trained statistical model 904 may be provided to the scoring apparatus 900, which calculates the expertise scores 902 for member profiles not included in the training data (such as recent hire member profiles supplied by the searcher) by applying the statistical model 904 to features (e.g., features 906-908) for each of the items. For example, a feature vector may be generated for each item from a subset of the features 906-908 in the data repository 910, and the statistical model 904 may be applied to the feature vector to calculate an expertise score 902 for the item with respect to a dimension of the member profile.

The features 906-908 used in the calculation of the expertise scores 902 may include demographic features, social features, and behavioral features. Demographic features may include data related to a member's location, age, experience, education, and/or background; social features may include features related to the behavior of other members with respect to the member; and behavioral features may include features related to the member's actions or behavior with a social networking service and/or related websites or applications. In some embodiments, the social networking service is an online professional network.

Figure 10:
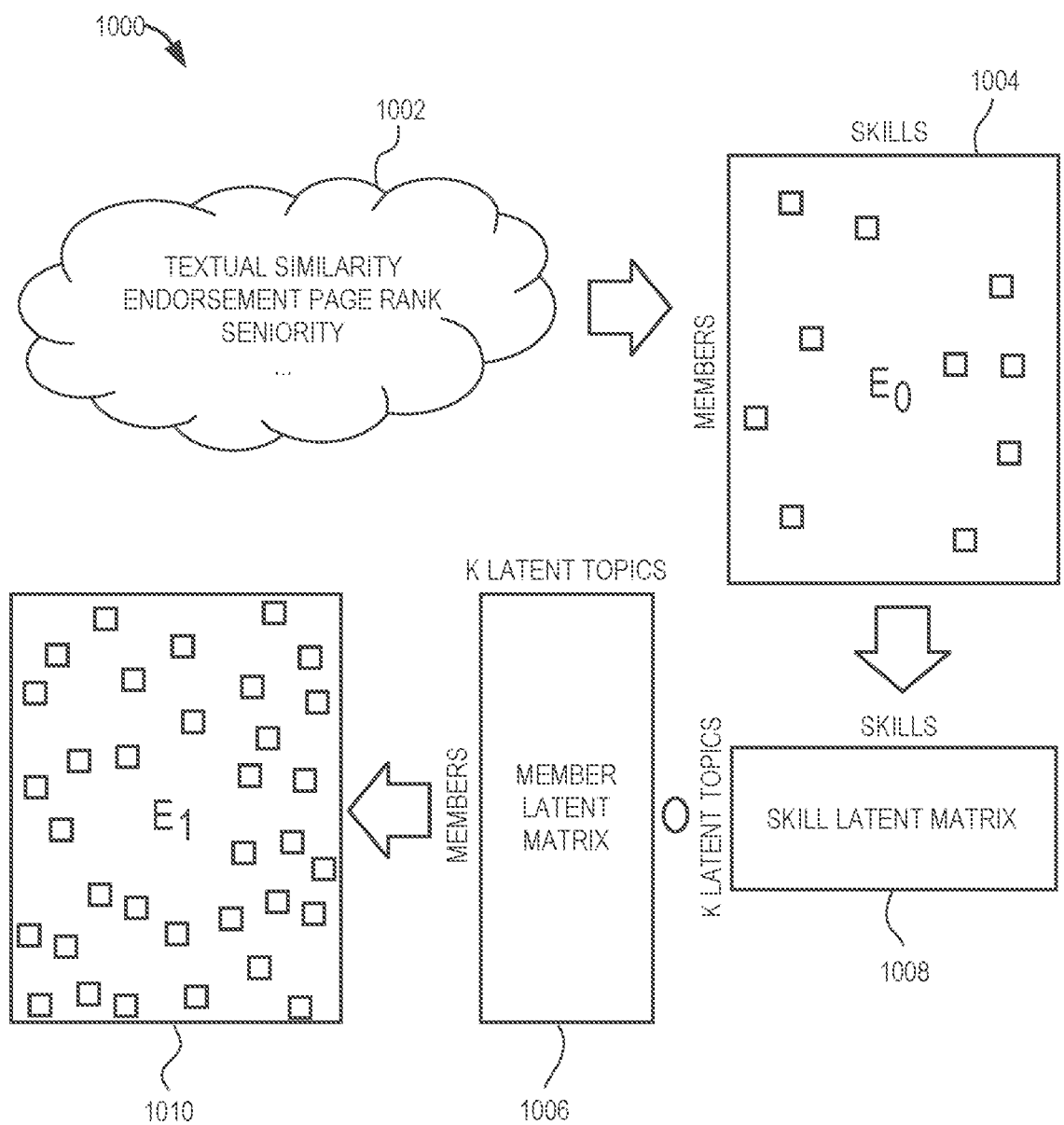
FIG. 10 is a diagram illustrating an offline process to estimate expertise scores, in accordance with another example embodiment.

FIG. 10 is a diagram illustrating an offline process 1000 to estimate expertise scores, in accordance with another example embodiment. A supervised machine learning algorithm combines various signals 1002, such as skill-endorsement graph page rank, skill-profile textual similarity, member seniority, etc., to estimate the expertise score. After this step, a formed expertise matrix 1004 is very sparse since only a small percentage of the pairs can be predicted with any degree of certainty. The formed expertise matrix 1004 may be factorized into a member matrix 1006 and a skill matrix 1008 in K-dimensional latent space. Then, the dot product of the formed expertise matrix 1004 and the skill matrix 1008 is computed to fill in the 'unknown' cells. The intuition is that the more members list two particular skills in their corresponding member profiles (called co-occurrence of skills), the more likely it is that a member only listing one of those skills also has the other skill as a latent skill. Since the dot product results in a large number of non-zero scores of each member on the skills, the scores can then be thresholded such that if the member's score on a skill is less than a particular threshold, the member is assumed not to know the skill and is assigned a zero expertise score on the skill. Thus, a final expertise matrix 1010 is still sparse, but relatively much denser than the formed expertise matrix 1004.

Referring back to FIG. 3, given a set of input recent hires, the skills generator 312 can rank the skills for the group of recent hires. Then, the top N ranked skills can be selected to represent the recent hires. Expertise scores of a recent hire on outlier skills are zero or low, and thus these skills are unlikely to be selected. Moreover, because skills are summed over all candidates, the skills that many candidates have are boosted, thus representing the commonality of the skill set among all recent hires.

Turning now to organizations such as related or similar companies, for a particular company, given the recent hire profiles, the query generator 306 can generate queries based on a set of other companies, outside of the particular company, that are likely to have candidates similar to the particular company's recent hires in their recent hire profiles. In order to accomplish this, the query generator 306 contains an organization generator 314, which can use collaborative filtering to find organization relationships. The organizations can be companies or other organizations that have been browsed or that candidates have been associated with, such as, for example, corporations, firms, universities, hospitals, government entities, or other organizations. The organizations can be organizations that candidates have worked for or have been under contract to (e.g., as consultants, temporary employees, interns, or contractors). Specifically, an organization browse map using co-viewing relationships (people who view organization or company A and view organization or company B) may be utilized. Intuitively, organizations or companies co-viewed by highly overlapped sets of people are likely to be similar. Thus, activity and/or usage information for searchers/browsers within the social networking service may be retrieved and mined to construct the organization browse map, and this browse map may then be used to find the organization relationships by the organization generator 314. Other information may be used either in conjunction with or in lieu of the organization browse map. For example, the social networking service may keep track of candidates who apply to a given organization or company. Therefore, it may deduce that if a member who applied to organization B also applied to organization A, then organization A and organization B are similar. This similarity relationship may be used as the browse map is used to generate companies or organizations related to companies or organizations identified in profiles of recent hires. Another signal that may be used is organization movement, meaning that if a relatively large number of people who left organization A went to work for organization B, this might imply that organization A and organization B are somewhat similar.

Similar strategies can be used for other facets of a query. For example, title, industry, seniority, years of experience, locations, and schools can all be expanded from those facets in the recent hire profiles by finding similar facets using, for example, browse maps.

Once the query generator 306 completes generating the query based on the techniques described above, the query may be submitted to a search engine such as, for example, the query processor 308, to return search results. The search results represent candidates who are similar in some ways to the recent hires that have been selected or hired by the searcher, thus alleviating the searcher of the burden of composing the query. Once the results are returned, a search results ranker 310 may rank the search results according to one or more ranking algorithms. A subset of the top-ranked search results may then be displayed to the searcher using a results display component 316. In an example embodiment, the results display component 316 interacts with the client profile search component 302 to facilitate such a display. The number of top-ranked search results displayed may vary based on, for example, current size of a display window, font size, user preferences, etc.

While any ranking algorithms may be used by the search results ranker 310 to rank the search results, in an example embodiment a machine learning algorithm is used to train a ranking model specifically to be used with searches generated by searchers providing, recent hires in lieu of text-based keywords. Given the significant difference between a search by recent hires and a traditional query-based search, this algorithm helps provide rankings that accommodate this new type of search.

Figure 11:
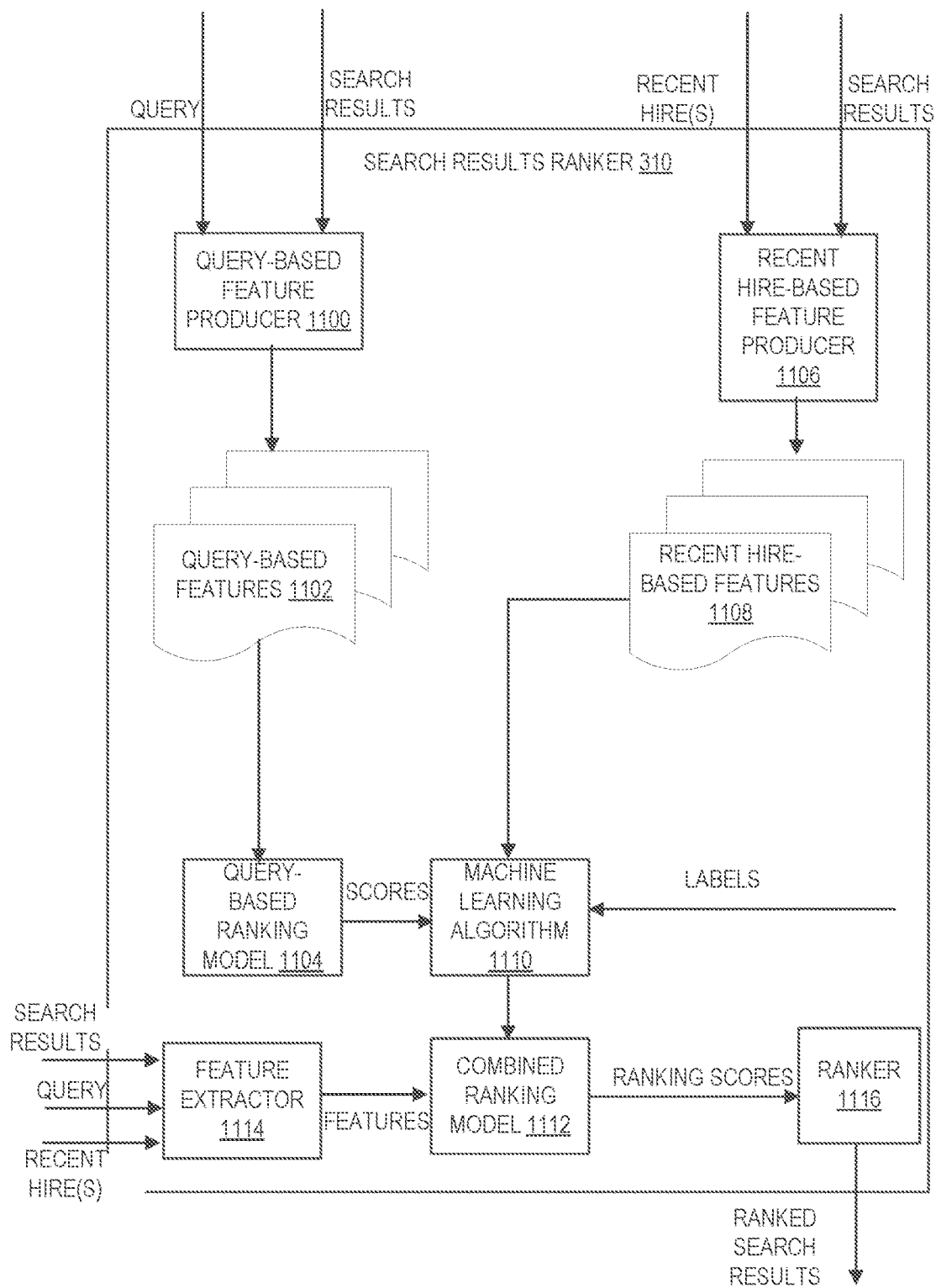
FIG. 11 is a block diagram illustrating a candidate search results ranker in more detail, in accordance with an example embodiment.

FIG. 11 is a block diagram illustrating the search results ranker 310 in more detail, in accordance with an example embodiment. The search query that produced the search results, as well as the search results, may be fed to a query-based feature producer 1100, which produces a set of query-based features 1102 of the results. The query based features 1102 include search engine features such as term frequency-inverse document frequency (TF-IDF), term location in document, bag-of-words, etc. These query-based features 1102 may be fed to a query based ranking model 1104, which returns scores for each of the query/result pairs.

Separately, a recent hire-based feature producer 1106 receives as input the specified recent hire(s) and the search results from the query generated by the recent hire(s). The recent hire-based feature producer 1106 then produces a set of recent hire-based features 1108 of the results. The recent hire-based features 1108 include features that are based on a comparison of recent hires and the search results, with each feature measuring one recent hire/search result pair. Example recent hire-based features include similar career path, skill similarity, headline matching, headline similarity, and browse map similarity.

Similar career path is a measure of a trajectory similarity between the positions held by the recent hire and the search result. Thus, for example, if the recent hire started as an intern, was promoted to a staff engineer, and then was promoted to project manager, a search result having a similar progression of the trajectory of their career path would rank higher in this feature than, for example, a search result who started off at the top (e.g., as a project manager). To capture the trajectory information, each member profile may be modeled as a sequence of nodes, each of which records all information within a particular position of a member's career, such as company, organization, title, industry, time duration, and keyword summary.

At the node (position) level, a career path (e.g., career trajectory) similarity can then be ascertained by using a generalized linear model, although in other embodiments other approaches could be substituted. Then, at the sequence (profile) level, a sequence alignment method may be employed to find an optimal or near-optimal alignment between pairs of nodes from the two career paths.

Various schemes may be used to model the node corresponding to a job position, including sequence of positions and sequence of compositions. In the sequence of positions scheme, each node represents one particular position of the member's professional experience. In the sequence of compositions scheme, for each node, in addition to position information, transition information is also incorporated between the given position and the previous one. In other words, the position information, along with transition-related information, together comprise the node. Transition information, such as whether the member's title changes in this transition, whether the company or organization changes, how the seniority changes, and the time spent in this transition, enhances the representation of this scheme by further disclosing information about the changing trend between a previous and a given position.

When evaluating the similarity between two career paths, each node is a representation of one particular work experience. In order to compute the overall similarity between two career sequences, the score for the query/result pair can be decomposed into the sum of the similarities between several respective pairs of aligned nodes from the two sequences. A sequence alignment algorithm can be used to measure the sequence level similarity by calculating the sum of the optimal alignments of node pairs. The two sequences can be aligned incrementally. The sequence alignment scheme can be formulated as a dynamic programming procedure.

A similarity model may be learned at the node level by using, for example, a logistic regression model. Features relevant to this model may include, for example, current title, current company, current company size, current industry, current functions, job seniority, current position summary, title similarity, company similarity, industry similarity, duration difference between positions, whether two transitions were within the same company, whether two transitions were in the same industry, whether seniority changed, whether the title changed, and duration of time between the two transitions.

Skill similarity is a measure of similarity of the skill set of the recent hire and the skill set of the search result. It should be noted that skill sets may include skills that are explicit (e.g., specified by the member in their member profile) or implicit (e.g., skills that are similar to skills specified by the member in their member profile, but not explicitly listed).

Headline matching is a measure of the similarity between the query and the headline of each result. Notably, this is based on a text-based comparison, and is not strictly recent hire-based. In an embodiment where the recent hire-based feature producer 1106 accesses the query, these comparisons can be made by the recent hire-based feature producer 1106. A headline is one or more visible fields (along with names) displayed as a search result snippet for a search result. Such snippets often include a headline that helps explain why the result is relevant and likely to trigger actions from the searcher. The headline-matching feature, therefore, measures the similarity between the query and this headline from the search result's snippet.

Headline similarity is a measure of the similarity between a headline of the recent hire and the headline of the search result. This similarity calculation may be performed with or without considering word semantics. In example embodiments where word semantics are not considered, a word2vec algorithm may be utilized. Word2vec is a group of related models used to produce word-embedding. The word-embeddings are shallow, two-layer neural networks that are trained to reconstruct linguistic, contexts of words. The neural network is shown a word and guesses which words occurred in adjacent position in an input text. After training, word2vect models can be used to map each word to a vector of typically several hundred elements, which represent that word's relation to other words.

Browsemap similarity is a measure of whether and how much other members/searchers/browsers visited both the recent hire's profile and the search result's profile in the same browsing session. The intuition is that if previous members/searchers/browsers viewed both profiles in the same session, then there is a higher likelihood that the profiles are similar, and thus that the underlying recent hire and search result are similar.

The recent hire-based features 1108 may be fed along with the scores from the query-based ranking model 1104 to a machine learning algorithm 1110. The machine learning algorithm 1110 is designed to train a combined ranking model 1112 that is capable of determining a ranking score for a search result at runtime. This training may use labels supplied for training data (e.g., training recent hires and training search results along with labeled scores for each). The training may involve the machine learning algorithm 1110 learning which features/scores are more or less relevant to the ranking scores, and appropriately weighting such features and scores for runtime computations. At runtime, a feature extractor 1114 extracts both query-based and recent hire-based features from the query, search results, and recent hires, and feeds these features to the combined ranking model 1112, which produces the scores as per its model. A ranker 1116 then uses these ranking scores to rank the search results for display to the searcher.

It should be noted that since searching by recent hires is a relatively new concept, it is difficult to generate labeled data directly from a log of previous search systems, as would typically be done to generate labeled data. Instead, in an example embodiment, labeled data is generated from the log of a query-based search. One such log is a log of electronic communications performed after the search. For example, if a searcher sees 20 results to a query-based search for candidates, and sends email communications to 8 candidates from the 20 results, then it may be assumed that these 8 candidates are similar enough to be considered for the same job, and thus if a profile for one or more of those 8 candidates had been submitted for a search by recent hire, the other candidates could be considered likely top results. In an example embodiment, other actions taken with respect to previous search results may be logged and similarly used to determine recent hire matches. For example, while communication with a candidate may be considered as strongly indicative of a match for the underlying position (and thus a match with other candidates also emailed for the same position) and assigned a high relevance score, clicking on a candidate (without an email) may be considered to be a partial match and may be assigned a moderate relevance score, while skipped results might be considered a low relevance score. The relevance scores may be used as the labels for the sample data.

Thus, in an example embodiment, communications between searchers and members of the social network service are monitored and logged, and these communications are used to derive a label score for each sample search result/recent hire pair. Such sample search results may simply be the search results presented in response to previous queries. The label score may be generated using various combinations of the metrics described above. For example, if the same searcher communicated with both candidates A and B in response to the same search query, then candidate B is assigned a score of 5 (on a scale of 1 to 5, 5 being most relevant) for a recent hire A and candidate A is assigned a score of 5 for a recent hire B. Actions such as clicking on a candidate that indicate a moderate relevance may be assigned a score of 3, and taking no action may be assigned a score of 1. Scores for various log entries can then be combined and averaged. The result is profile pairs that have been assigned scores of between 1 and 5 based on previous actions or inactions by previous searchers. These label scores may then be used as labels for hypothetical recent hire/search result pairs for those same member profiles.

In an example embodiment, a dynamic weight trainer is introduced into the architecture of FIG. 11 in order to dynamically alter the weights assigned to the recent hire-based features 1108. Specifically, a search query need not be limited to a single query before the search is complete. Often the searcher may interact with the original query and search results to provide additional refinements of the original search. This is not only true with traditional text-based searches but also can be true with recent hire-based searches as well. This may be accomplished by the searcher applying additional filters or making text-based additions to the initial recent hire-based search to refine the results. The result is that the recent hire-based features, which directly measure the similarity between the recent hire(s) and the search results, become less and less important as the search is refined.

At the same time, as the search session continues, the confidence of the remaining attributes (e.g., query-based attributes) increases in usefulness.

Figure 12:
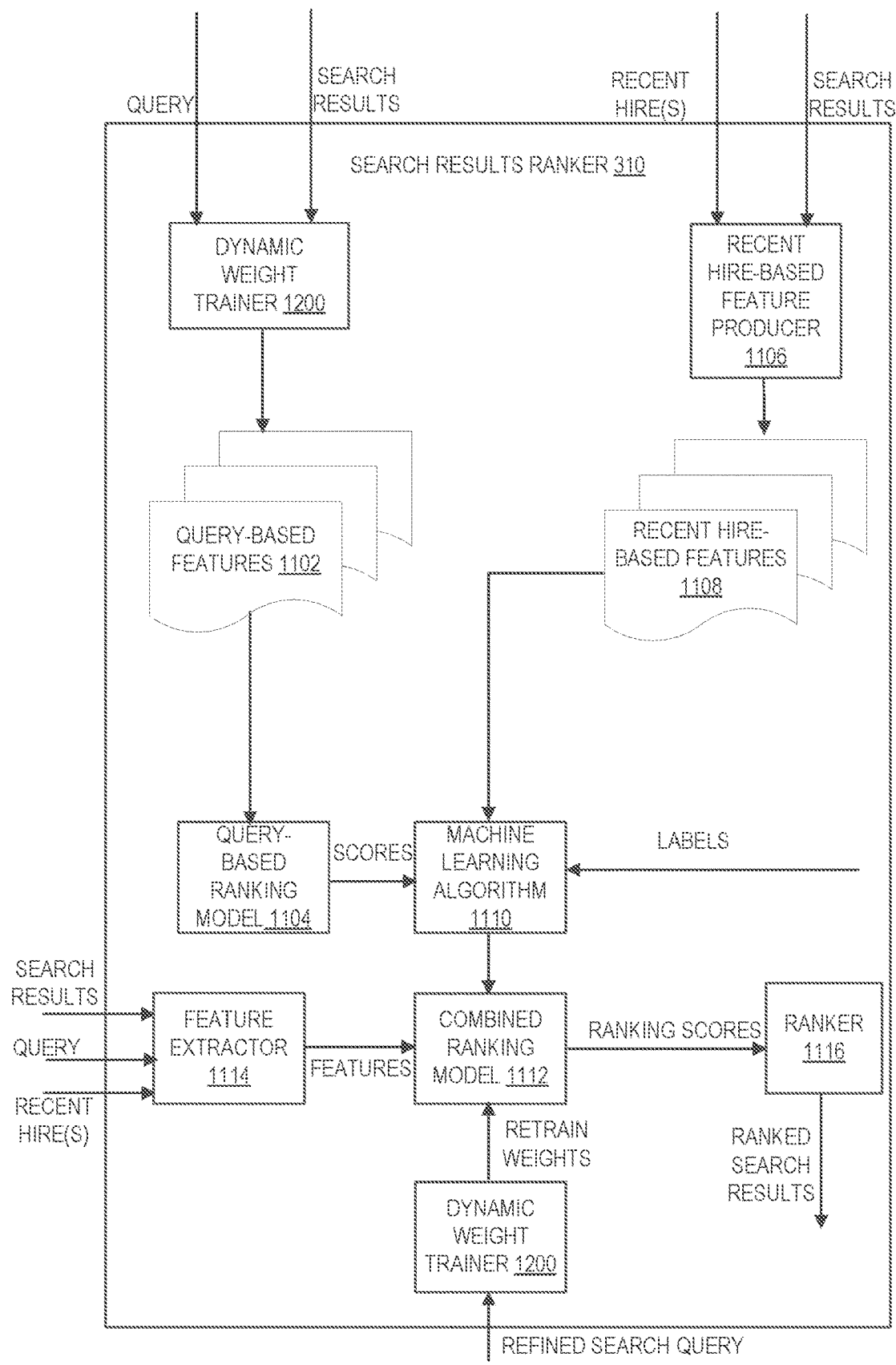
FIG. 12 is a block diagram illustrating a search results ranker in more detail, in accordance with another example embodiment.

FIG. 12 is a block diagram illustrating the search results ranker 310 in more detail, in accordance with another example embodiment. FIG. 12 is identical to FIG. 11 with the exception of the addition of a dynamic weight trainer 1200. The purpose of the dynamic weight trainer 1200 is to dynamically alter the weights of the features extracted to favor the query-based features 1102 over the recent hire-based features 1108 over time. This may be performed by applying a decay function, defined on some measure of session length, such as the number of query refinements, to gradually reduce the weights of the recent hire-based features 1108 and/or increase the weights of the query-based features 1102. This function controls the dynamic balance between the impacts of the input recent hires and the query on the result ranking.

Figure 13:
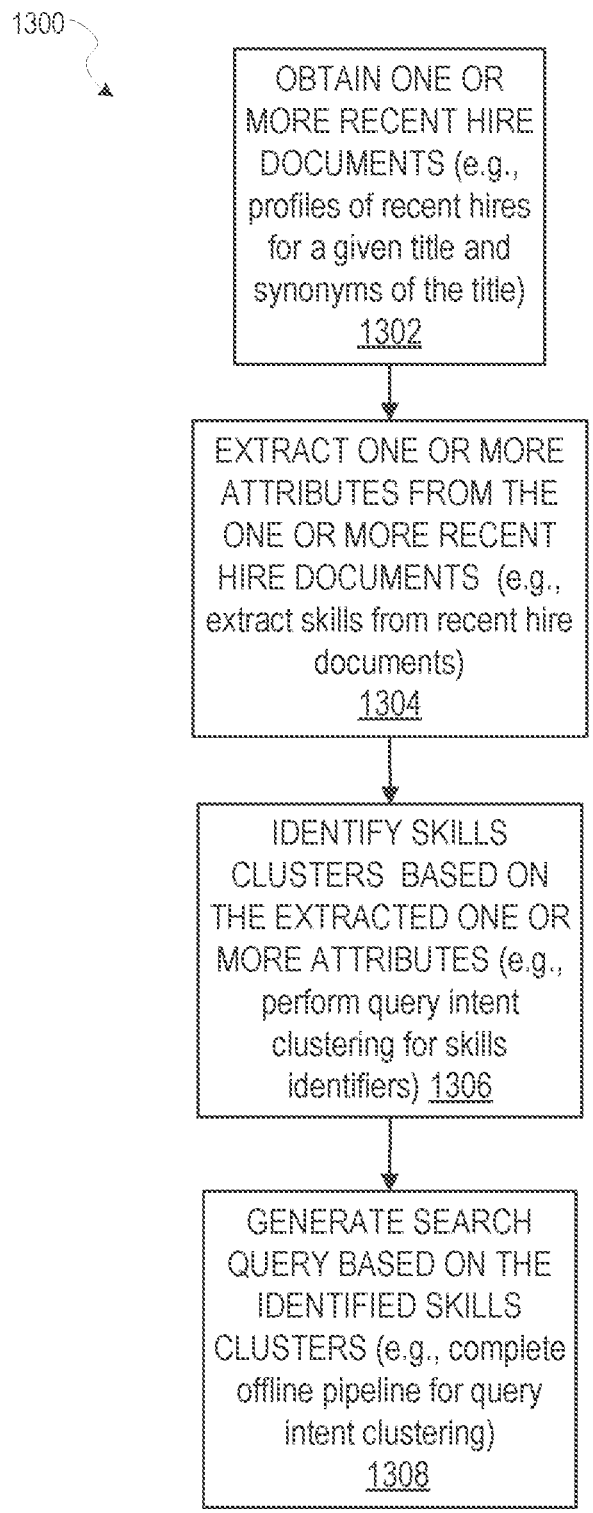
FIG. 13 is a flow diagram illustrating a method for performing a recent hire based search in accordance with an example embodiment.

FIG. 13 is a flow diagram illustrating a method 1300 for performing a recent hire-based search in accordance with an example embodiment. At operation 1302, one or more recent hire documents may be obtained. In an example embodiment, these documents are member profiles in a social networking service. As shown, operation 1302 can include obtaining profiles of recent hires for a given title and synonyms of the title. Such profiles can be automatically identified based on a particular title supplied by the searcher, and that title's synonyms. In an alternative or additional embodiment, the profiles can be obtained by a searcher specifying the corresponding members and the member profiles being retrieved from a database based on the searcher's specified members. However, implementations are possible where the documents obtained are not member profiles.

At operation 1304, one or more attributes are extracted from the one or more recent hire documents. As shown, operation 1304 can include extracting skills from recent hire documents. Operation 1304 can include mapping the extracted skills to skill identifiers (skill IDs).

At operation 1306, skills clusters are identified based on the extracted one or more attributes. As shown in FIG. 13, operation 1306 can include performing query intent clustering for skills IDs obtained in operation 1304.

At operation 1308, a search query is generated based on the identified skills clusters. As shown, operation 1308 can comprise completing an offline pipeline for query intent clustering. In an optional additional operation, a search can be performed on documents using the generated search query, returning one or more result documents. As with the recent hire documents, the result documents may also be member profiles in a social networking service.

Figure 14:
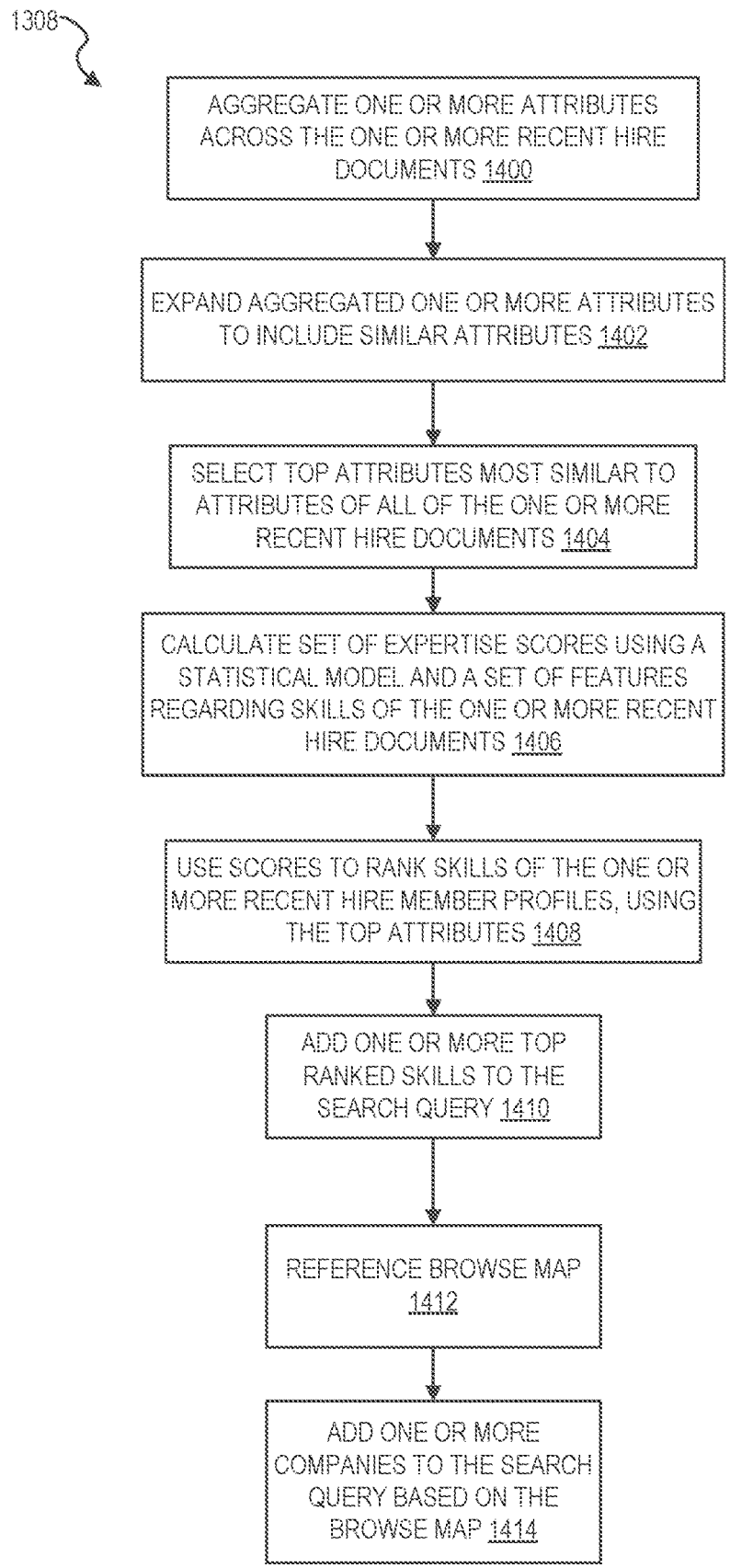
FIG. 14 is a flow diagram illustrating generating a search query based on one or more extracted attributes, in accordance with an example embodiment.

FIG. 14 is a flow diagram illustrating a method of generating a search query based on one or more extracted attributes, in accordance with an example embodiment. FIG. 14 corresponds to operation 1308 of FIG. 13 in more detail. At operation 1400, the one or more attributes are aggregated across the one or more recent hire documents. At operation 1402, the aggregated one or more attributes are expanded to include similar attributes. At operation 1404, top attributes most similar to attributes of all of the one or more recent hire documents are selected. At operation 1406, a set of expertise scores are calculated using a statistical model and a set of features regarding skills of the one or more recent hire documents. The statistical model may be a logistic regression model trained using a machine learning algorithm. At operation 1408, the expertise scores are used to rank skills of the one or more recent hire documents, using the top attributes. At operation 1410, one or more top-ranked skills are added to the search query.

At operation 1412, a browse map is referenced. At operation 1414, one or more companies are added to the search query, the companies being ones that have been co-viewed during the same browsing session as a company identified in one or more of the recent hire documents, by using the browse map.

Figure 15:
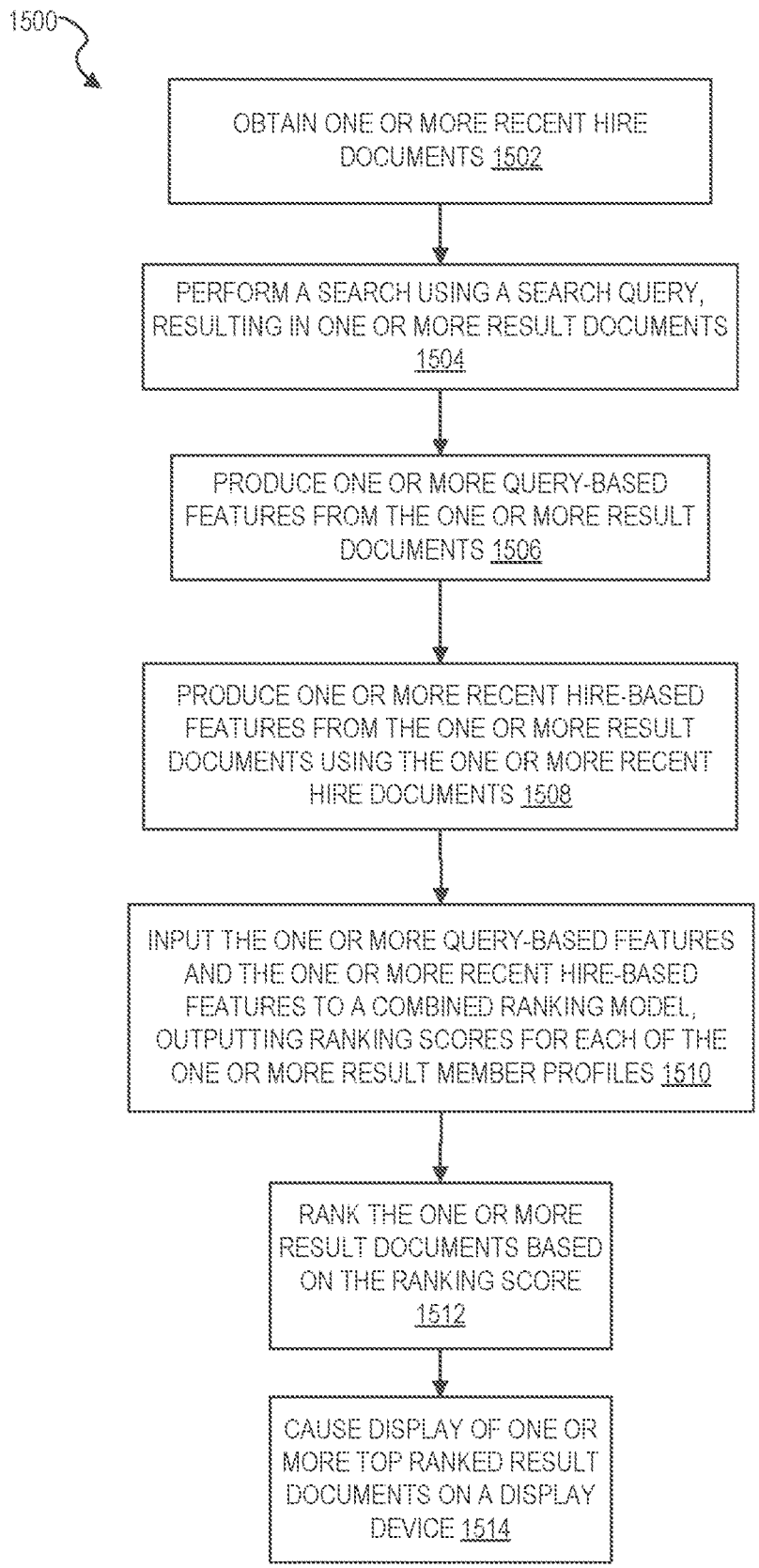
FIG. 15 is a flow diagram illustrating a method of ranking search results using recent hires, in accordance with an example embodiment.

FIG. 15 is a flow diagram illustrating a method 1500 of ranking search results using recent hires in accordance with an example embodiment. At operation 1502, one or more recent hire documents may be obtained. In an example embodiment, these documents are member profiles in a social networking service and they are obtained by a searcher specifying the corresponding members and the member profiles being retrieved from a database based on the searcher's specified members. However, implementations are possible where the documents obtained are not member profiles.

At operation 1504, a search is performed using a search query, resulting in one or more result documents. Like the recent hire documents, the result documents may be member profiles in an example embodiment. In one example embodiment, operation 1504 can be performed using some of the operations described above with respect to FIGS. 13 and 14.

At operation 1506, one or more query-based features are produced from the one or more result documents using the search query. As described above, this may include features such as TF-IDF.

At operation 1508, one or more recent hire-based features may be produced from the one or more result documents using the one or more recent hire documents. As described above, the recent hire-based features may include similar career path, skill similarity, headline matching, headline similarity, and/or browsemap similarity.

At operation 1510, the one or more query-based features and the one or more recent hire-based features are input to a combined ranking model, outputting ranking scores for each of the one or more result member profiles. The combined ranking model may be trained using similar query-based and recent hire-based features from sample result documents as well as sample search queries and labels.

At operation 1512, the one or more result documents are ranked based on the ranking scores. At operation 1514, display of one or more top-ranked result documents on a display device is caused. In certain embodiments, operation 1514 can include causing display of the one or more top-ranked result documents on a computer display, such as, for example, a display screen of a laptop computer, a mobile device (e.g., a smartphone), or a desktop computer.

Figure 16:
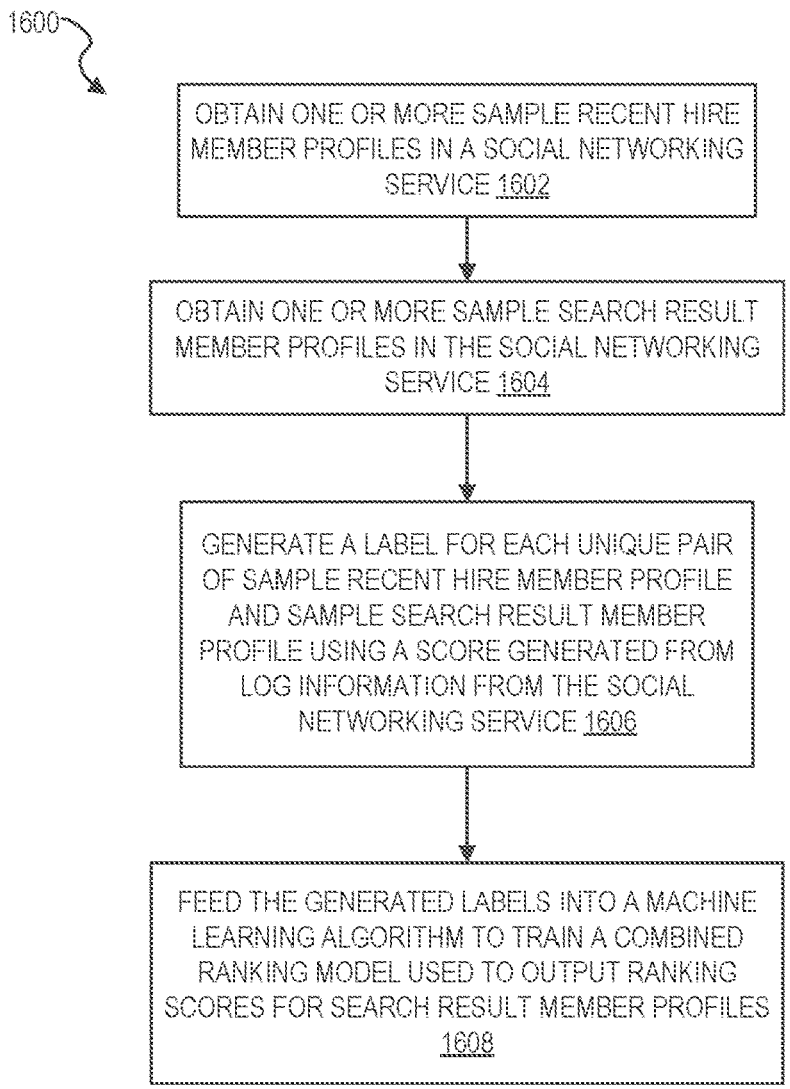
FIG. 16 is a flow diagram illustrating a method for generating labels for sample recent hire member profiles in accordance with an example embodiment.

FIG. 16 is a flow diagram illustrating a method 1600 for generating labels for sample recent hire member profiles, in accordance with an example embodiment. At operation 1602, one or more sample recent hire member profiles in a social networking service are obtained. At operation 1604, one or more sample search result member profiles in the social networking service are obtained. At operation 1606, for each unique pair of a sample recent hire member profile and a sample search result member profile, a label is generated using a score generated from log information of the social networking service. The log information includes records of communications between a searcher and members of the social networking service, the score being higher if the searcher communicated with both the member corresponding to the sample recent hire member profile and the member corresponding to the sample search result member profile in a same search session.

The log information may further include records of user input by the searcher, the user input causing interaction with member profiles in the social networking service but not resulting in communications between the searcher and the members of the social networking service corresponding to both the sample recent hire member profile and the sample search result member profile in the same search session. An example would include the searcher clicking on member profiles and viewing the member profiles but not emailing the corresponding members. A search session may be defined in a number of different ways. In one example embodiment, a search session is the same as a browsing session (e.g., as long as the searcher is logged in to the social networking service). In another example embodiment, the search session is limited to a period of time between a searcher initiating a search and the searcher submitting an unrelated search or logging off the social networking service.

At operation 1608, the generated labels are fed into a machine learning algorithm to train a combined ranking model used to output ranking scores for search result member profiles.

Figure 17:
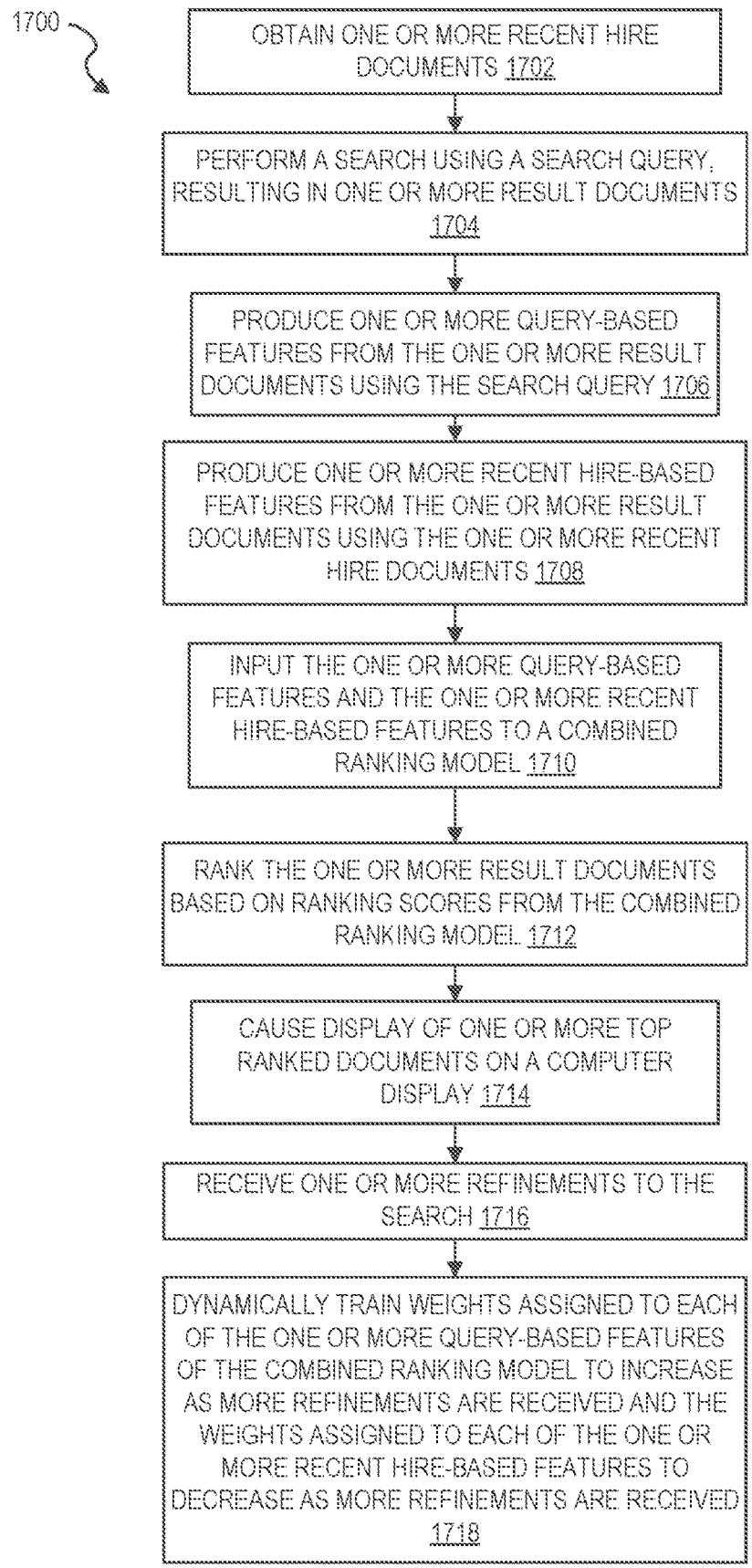
FIG. 17 is a flow diagram illustrating a method of dynamically training weights of a machine learning algorithm model in accordance with an example embodiment.

FIG. 17 is a flow diagram illustrating a method 1700 of dynamically training weights of a machine learning algorithm model in accordance with an example embodiment. At operation 1702, one or more recent hire documents are obtained. At operation 1704, a search is performed using a search query, returning one or more result documents. This search query may or may not have been generated using the one or more recent hire documents.

At operation 1706, one or more query-based features are produced from the one or more result documents using the search query. At operation 1708, one or more recent hire-based features are produced from the one or more result documents using the one or more recent hire documents. At operation 1710, the one or more query-based features and the one or more recent hire-based features are input to a combined ranking model. The combined ranking model is trained by a machine learning algorithm to output a ranking score for each of the one or more result documents. The combined ranking model includes weights assigned to each of the one or more query-based features and each of the one or more recent hire-based features.

At operation 1712, the one or more result documents are ranked based on the ranking scores. At operation 1714, display of one or more top-ranked documents on a computer display is caused. At operation 1716, one or more refinements to the search are received. At operation 1718, the weights assigned to each of the one or more query-based features are dynamically trained to increase as more refinements are received, and the weights assigned to each of the one or more recent hire-based features are dynamically trained to decrease as more refinements are received. This dynamic training may utilize a decay function based on, for example, time or number of refinements.

Figure 18:
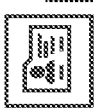
FIG. 18 is a screen capture illustrating a first screen of a user interface for performing a recent hire based search, in accordance with an example embodiment.

FIG. 18 is a screen capture illustrating a first screen 1800 of a user interface for performing a recent hire-based search for candidates in accordance with an example embodiment. The first screen 1800 includes an area 1802 where a searcher can specify one or more recent hires for the search.

Figure 19:
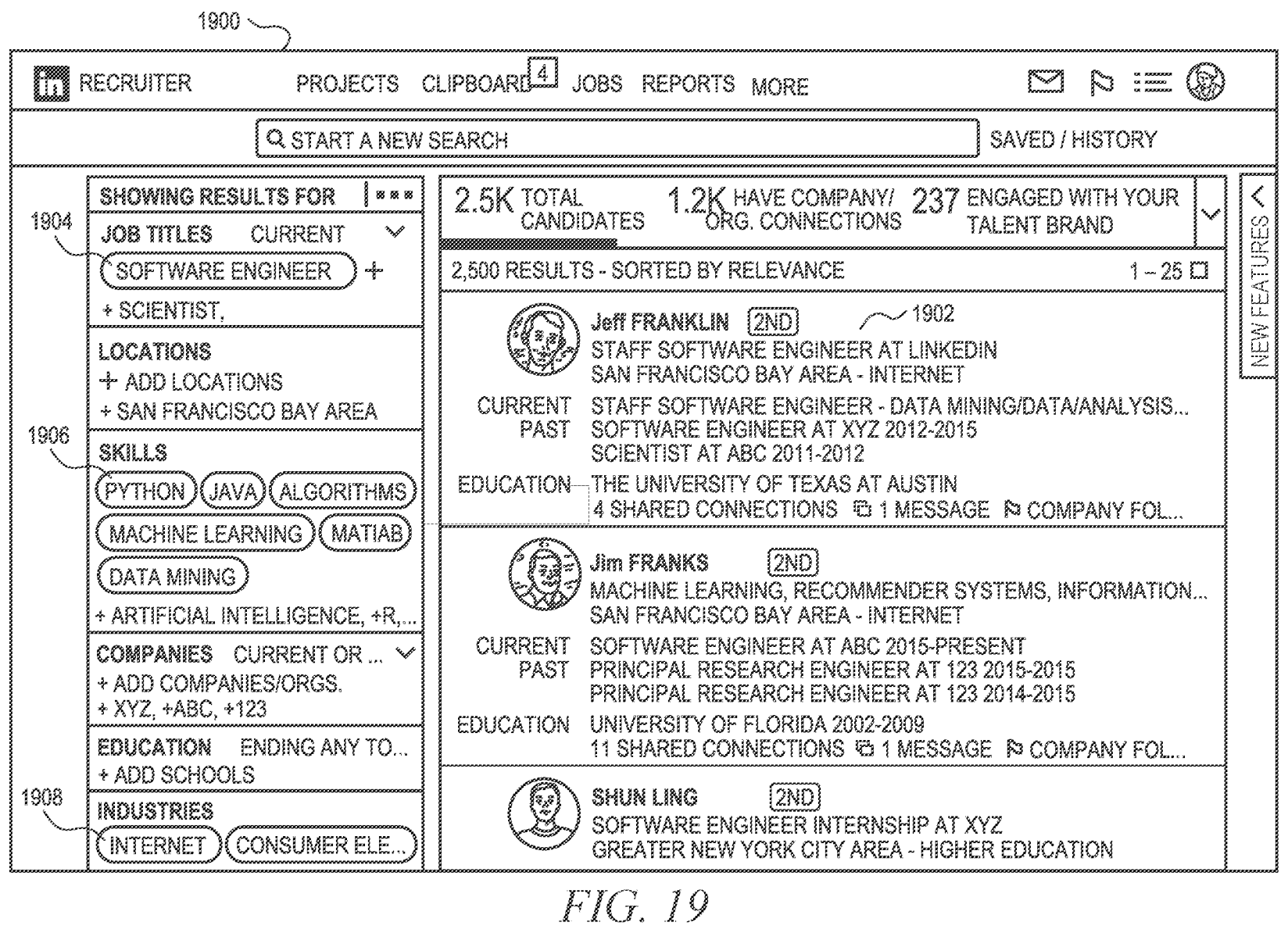

FIG. 19 is a screen capture illustrating a second screen 1900 of the user interface for performing a recent hire-based candidate search, in accordance with an example embodiment. The second screen 1900 presents results 1902 of the search, as well as displays the query generated using the specified recent hires, the query used for the search. The query may be displayed by highlighting terms of the query in various categories. For example, 'software engineer' 1904 is a job title that was generated for the query, 'python' 1906 is a skill that was generated for the query, and 'Internet' 1908 is an industry that was generated for the query. The searcher can then easily modify the query by adding additional terms to the query and/or removing some of the identified terms that had been previously generated.

Modules, Components, and Logic

Certain embodiments are described herein as including logic or a number of components, modules, or mechanisms. Modules may constitute either software modules (e.g., code embodied on a machine-readable medium) or hardware modules. A 'hardware module' is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module ma include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and user interfaces described in conjunction with FIGS. 1-19 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the internet of things (IoT), while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 20:
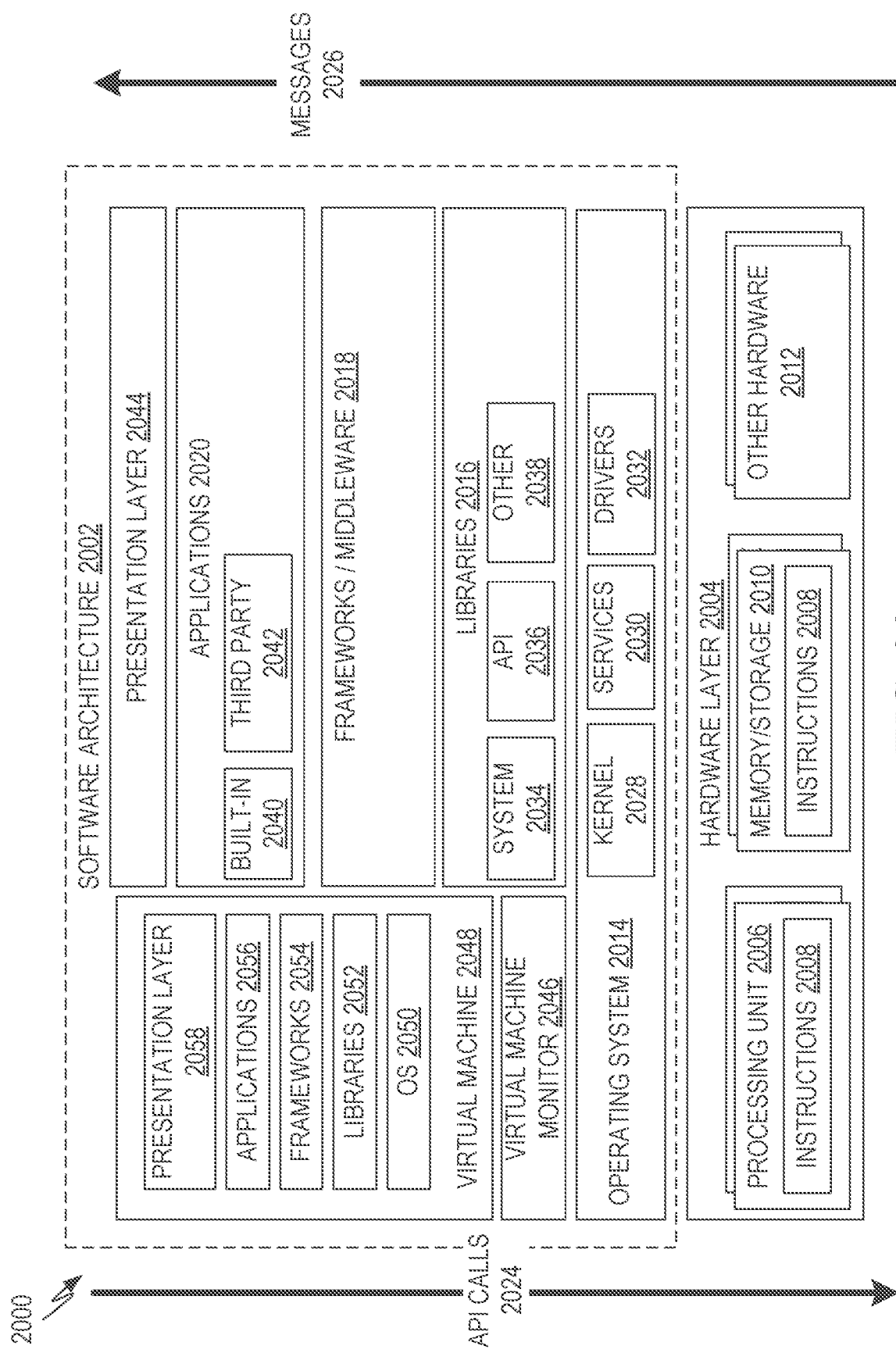
FIG. 20 is a block diagram illustrating a representative software architecture, which may be used in conjunction with various hardware architectures herein described.

FIG. 20 is a block diagram 2000 illustrating a representative software architecture 2002, which may be used in conjunction with various hardware architectures herein described. FIG. 20 is merely a non-limiting example of a software architecture, and it will be appreciated that many other architectures may be implemented to facilitate the functionality described herein. The software architecture 2002 may be executing on hardware such as a machine 2100 of FIG. 21 that includes, among other things, processors 2110, memory/storage 2130, and I/O components 2150. A representative hardware layer 2004 is illustrated and can represent, for example, the machine 2100 of FIG. 21. The representative hardware layer 2004 comprises one or more processing units 2006 having associated executable instructions 2008. The executable instructions 2008 represent the executable instructions of the software architecture 2002, including implementation of the methods, modules, user interfaces, and so forth of FIGS. 1-19. The hardware layer 2004 also includes memory and/or storage modules 2010, which also have the executable instructions 2008. The hardware layer 2004 may also comprise other hardware 2012, which represents any other hardware of the hardware layer 2004, such as the other hardware illustrated as part of the machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive responses, returned values, and so forth, illustrated as messages 2026, in response to the API calls 2024. The layers illustrated are representative in nature and not all software architectures have all layers. For example, some mobile or special-purpose operating systems may not provide a layer of frameworks/middleware 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than by interfacing directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. The third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as the operating system 2014 to facilitate functionality described herein.

The applications 2020 may utilize built-in operating system 2014 functions (e.g., kernel 2028, services 2030, and/or drivers 2032), libraries 2016 (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module 'logic' can be separated from the aspects of the application/module that interact with a user.

Some software architectures utilize virtual machines. In the example of FIG. 20, this is illustrated by a virtual machine 2048. A virtual machine creates a software environment where applications/modules can execute as if they were executing on a hardware machine (such as the machine 2100 of FIG. 21, for example). A virtual machine is hosted by a host operating system (e.g., operating system 2014 in FIG. 20) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Architecture and Machine-Readable Medium

Figure 21:
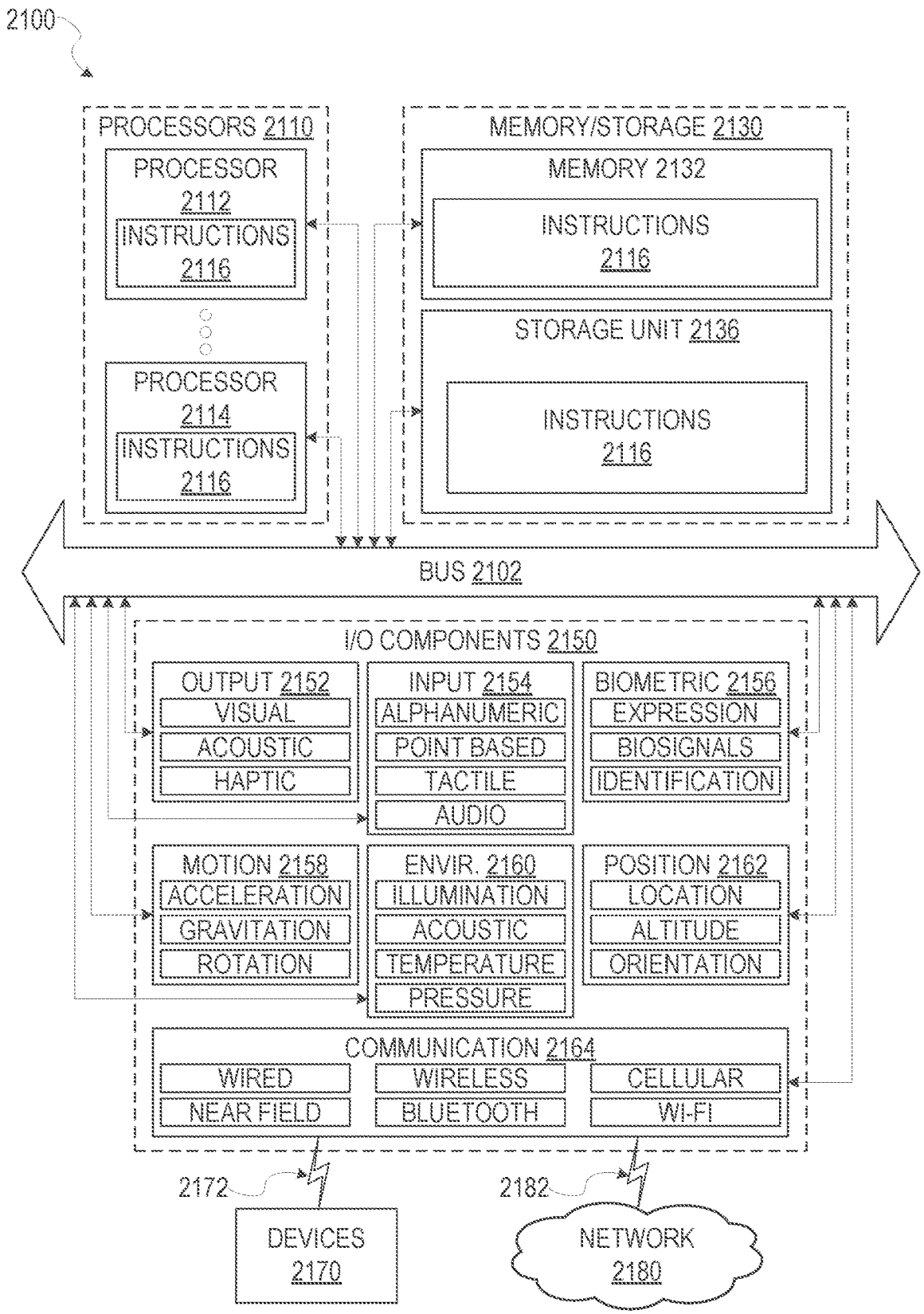
FIG. 21 is a block diagram illustrating components of a machine, according to some example embodiments, able to read instructions from a machine-readable medium (e.g., a machine-readable storage medium) and perform any one or more of the methodologies discussed herein.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, as app, or other executable code) for causing the machine 2100 to perform any one or more of the methodologies discussed herein may be executed. The instructions 2116 transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term 'machine' shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2112 and a processor 2114 that may execute the instructions 2116. The term 'processor' is intended to include multi-core processors that may comprise two or more independent processors (sometimes referred to as 'cores') that may execute instructions contemporaneously. Although FIG. 21 shows multiple processors 2110, the machine 2100 may include a single processor with a single core, a single processor with multiple cores (e.g., a multi-core processor), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, 'machine-readable medium' means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term 'machine-readable medium' should be taken to include a single medium or multiple media (e.g., a centralized or distributed database, or associated caches and servers) able to store the instructions 2116. The term 'machine-readable medium' shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a 'machine-readable medium' refers to a single storage apparatus or device, as well as 'cloud-based' storage systems or storage networks that include multiple storage apparatus or devices. The term 'machine-readable medium' excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154.

The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162, among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2158 may include acceleration sensor components (e.g., accelerometer), gravitation sensor components, rotation sensor components (e.g., gyroscope), and so forth.

The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 may include a network interface component or other suitable device to interface with the network 2180. In further examples, the communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, UltraCode, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, as extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., HTTP). Similarly, the instructions 2116 may be transmitted or received using a transmission medium via the coupling 2172 (e.g., a peer-to-peer coupling) to the devices 2170. The term 'transmission medium' shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component ma be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term 'invention' merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term 'or' may be construed in either an inclusive or an exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
   a processor;
   a storage device;
   an attribute extractor;
   a query generator; and
   a memory device holding an instruction set executable on the processor to cause the computer system to perform operations comprising:
   retrieving, from a database, one or more search attributes based on a mapping of the one or more search attributes to a given attribute submitted to an online networking service from a client system;
   based on one or more search attributes, performing a search to identify one or more recent hire member profiles that contain a search attribute from the one or more search attributes, the one or more recent hire member profiles having been modified with a preset period of time to add the search attribute;
   extracting, by the attribute extractor, one or more attributes from the one or more recent hire member profiles;
   storing, on the storage device, the extracted one or more attributes;
   identifying skills clusters based on the extracted one or more attributes retrieved from the storage device, the skills clusters based at least partially on skills shared by the identified one or more recent hire member profiles as compared to skills shared by member profiles that have not been modified within the preset period of time to add the search attribute; and
   generating, by the query generator, a search query based on the identified skills clusters.

2. The computer system of claim 1, the memory device to perform the operations comprising:
   causing presentation of the generated search query on a display device of the client system;
   subsequent to the presentation, receiving from the client system, a modified version of the generated search query; and
   executing the modified version of the generated search query to retrieve search results.

3. The computer system of claim 1, wherein identifying the skills clusters comprises:
   performing latent Dirichlet allocation (LDA) for the given attribute and one or more search attributes; and
   obtaining topic vectors resulting from performing the LDA.

4. The computer system of claim 1, wherein extracting the one or more attributes comprises:
   extracting skills from the one or more recent hire member profiles; and
   mapping the extracted skills to skill identifiers.

5. The computer system of claim 4, wherein identifying the skills clusters comprises performing query intent clustering for the skill identifiers.

6. The computer system of claim 4, wherein identifying the skills clusters comprises:
   creating a skills taxonomy for the skill identifiers; and
   representing each skill identifier in the skills taxonomy as a categorical variable that is either absent or present in a member profile.

7. The computer system of claim 4, wherein identifying the skills clusters comprises:
   performing latent class analysis (LCA) to create the skills clusters as clusters of the skill identifiers.

8. A computer-implemented method, comprising:
   retrieving, from a database, one or more search attributes based on a mapping of the one or more search attributes to a given attribute submitted to an online networking service from a client system;
   based on one or more search attributes, performing a search to identify one or more recent hire member profiles that contain a search attribute from the one or more search attributes, the one or more recent hire member profiles having been modified with a preset period of time to add the search attribute;
   extracting, by the attribute extractor, one or more attributes from the one or more recent hire member profiles;
   storing, on the storage device, the extracted one or more attributes;
   identifying skills clusters based on the extracted one or more attributes retrieved from the storage device, the skills clusters based at least partially on skills shared by the identified one or more recent hire member profiles as compared to skills shared by member profiles that have not been modified within the preset period of time to add the search attribute; and
   generating, by the query generator, a search query based on the identified skills clusters.

9. The computer-implemented method of claim 8, comprising:
   causing presentation of the generated search query on a display device of the client system;
   subsequent to the presentation, receiving from the client system, a modified version of the generated search query; and
   executing the modified version of the generated search query to retrieve search results.

10. The computer-implemented method of claim 8, wherein identifying the skills clusters comprises:
  performing latent Dirichlet allocation (LDA) for the given attribute title and one or more search attributes; and
  obtaining topic vectors resulting from performing the LDA.

11. The computer-implemented method of claim 8, further comprising:
  performing the search on the member profiles in the online networking service using the generated search query, returning one or more result member profiles as candidates.

12. The computer-implemented method of claim 8, wherein extracting the one or more attributes comprises:
  extracting skills from the one or more recent hire member profiles; and
  mapping the extracted skills to skill identifiers.

13. The computer-implemented method of claim 12, wherein identifying the skills clusters comprises performing query intent clustering for the skill identifiers.

14. The computer-implemented method of claim 12, wherein identifying the skills clusters comprises:
  creating a skills taxonomy for the skill identifiers; and
  representing each skill identifier in the skills taxonomy as a categorical variable that is either absent or present in a member profile.

15. The computer-implemented method of claim 12, wherein identifying the skills clusters comprises:
  performing latent class analysis (LCA) to create the skills clusters as clusters of the skill identifiers.

16. A non-transitory machine-readable storage medium comprising instructions that, when executed by one or more processors of a machine, cause the machine to:
  retrieving, from a database, one or more search attributes based on a mapping of the one or more search attributes to a given attribute submitted to an online networking service from a client system;
  based on one or more search attributes, performing a search to identify one or more recent hire member profiles that contain a search attribute from the one or more search attributes, the one or more recent hire member profiles having been modified with a preset period of time to add the search attribute;
  extracting, by the attribute extractor, one or more attributes from the one or more recent hire member profiles;
  storing, on the storage device, the extracted one or more attributes;
  identifying skills clusters based on the extracted one or more attributes retrieved from the storage device, the skills clusters based at least partially on skills shared by the identified one or more recent hire member profiles as compared to skills shared by member profiles that have not been modified within the preset period of time to add the search attribute; and
  generating, by the query generator, a search query based on the identified skills clusters.

* * * * *